United States Patent
Saylor et al.

(10) Patent No.: US 9,311,683 B1
(45) Date of Patent: Apr. 12, 2016

(54) MEASURING ENGAGEMENT WITH A SOCIAL NETWORKING PLATFORM

(71) Applicant: MicroStrategy Incorporated, Vienna, VA (US)

(72) Inventors: Michael J Saylor, Vienna, VA (US); Peter Jerome DiDomenico, III, Amissville, VA (US)

(73) Assignee: MicroStrategy Incorporated, Vienna, VA (US)

( * ) Notice: Subject to any disclaimer, the term of this patent is extended or adjusted under 35 U.S.C. 154(b) by 421 days.

(21) Appl. No.: 13/864,351

(22) Filed: Apr. 17, 2013

Related U.S. Application Data

(60) Provisional application No. 61/638,074, filed on Apr. 25, 2012.

(51) Int. Cl.
| | |
|---|---|
| *H04L 29/08* | (2006.01) |
| *G06Q 10/00* | (2012.01) |
| *G06Q 30/00* | (2012.01) |
| *G06Q 50/00* | (2012.01) |
| *G07F 17/32* | (2006.01) |

(52) U.S. Cl.
CPC .............. *G06Q 50/01* (2013.01); *G07F 17/32* (2013.01); *H04L 67/22* (2013.01); *G06Q 10/00* (2013.01); *G06Q 30/00* (2013.01)

(58) Field of Classification Search
CPC .... G06Q 30/02–30/0276; G06Q 10/00–10/10; G06Q 50/01; G06F 17/30–17/3089; H04N 21/00; H04L 67/22
See application file for complete search history.

(56) References Cited

U.S. PATENT DOCUMENTS

| | | | | |
|---|---|---|---|---|
| 8,375,024 | B2 * | 2/2013 | Goeldi | G06Q 10/00 707/709 |
| 8,924,465 | B1 * | 12/2014 | Tunguz-Zawislak | 709/203 |
| 2007/0198510 | A1 * | 8/2007 | Ebanks | 707/5 |
| 2009/0048904 | A1 * | 2/2009 | Newton | G06Q 30/0201 705/7.29 |
| 2011/0188647 | A1 * | 8/2011 | Tsuei | 379/142.17 |
| 2011/0282943 | A1 * | 11/2011 | Anderson et al. | 709/204 |
| 2013/0073336 | A1 * | 3/2013 | Heath | G06Q 30/02 705/7.29 |
| 2013/0073620 | A1 * | 3/2013 | Ghosh | G06Q 50/01 709/204 |
| 2013/0124257 | A1 * | 5/2013 | Schubert | 705/7.29 |
| 2013/0124478 | A1 * | 5/2013 | Ginzburg et al. | 707/639 |
| 2013/0203475 | A1 * | 8/2013 | Kil et al. | 463/7 |
| 2013/0246524 | A1 * | 9/2013 | Berner et al. | 709/204 |
| 2013/0262984 | A1 * | 10/2013 | Mehr et al. | 715/234 |
| 2014/0006414 | A1 * | 1/2014 | Oikonomou | G06F 17/3087 707/748 |
| 2014/0135109 | A1 * | 5/2014 | Barclay | G06Q 10/10 463/25 |
| 2014/0280206 | A1 * | 9/2014 | Krishnamurthy et al. | 707/748 |
| 2014/0316872 | A1 * | 10/2014 | Lee | G06Q 30/0214 705/14.16 |

OTHER PUBLICATIONS

Nichole Kelly, "4 ways to measure social media and its impact on your brand", Published on socialmediaexaminer.com on Jun. 15, 2010.*

(Continued)

*Primary Examiner* — Quang N Nguyen
*Assistant Examiner* — Raji Krishnan
(74) *Attorney, Agent, or Firm* — Fish & Richardson P.C.

(57) ABSTRACT

In one implementation, data that reveals a user identity's engagement with an electronic social networking platform is extracted from the electronic social networking platform. A numeric measure of the user identity's engagement with the platform then is calculated based on the extracted data.

14 Claims, 17 Drawing Sheets

(56) References Cited

OTHER PUBLICATIONS

Drew Neisser, "Which is Better for Social Media Monitoring: TweetDeck or SproutSocial?", Published on socialmediexaminer.com on Mar. 17, 2011.*

Paul Chaney, "Sprout Social: Social Media Management Time-Saving Tool", published on practicalecommerce.com on Apr. 26, 2011.*

Jean Deering Dvis, "5 Essential &Easy Social Media Metrics You Should be Measuring Right Now" published online before Apr. 3, 2012.*

* cited by examiner

| Friend | Rank | Status Posts | Posts to Friends | Check-Ins | Comments | Endorsements | Apps Installed | Events Attended | Pages Endorsed |
|---|---|---|---|---|---|---|---|---|---|
| Joanna | 1 | 188 | 1 | 0 | 2 | 9 | 6 | 0 | 3 |
| Vaughn | 2 | 128 | 0 | 1 | 1 | 0 | 11 | 0 | 7 |
| Coleen | 3 | 67 | 2 | 0 | 12 | 7 | 7 | 0 | 4 |
| Kristine | 4 | 55 | 1 | 18 | 4 | 2 | 5 | 1 | 1 |
| Sara | 4 | 33 | 0 | 6 | 26 | 0 | 2 | 2 | 1 |
| Danielle | 6 | 41 | 0 | 0 | 4 | 3 | 4 | 1 | 0 |
| Ed | 7 | 46 | 2 | 0 | 4 | 2 | 2 | 1 | 0 |
| Matt | 8 | 27 | 1 | 4 | 0 | 0 | 4 | 0 | 31 |

FIG. 5A

Filter

Location
- Country: All
- State: All
- City: All

Demographics
- Age (18-64)
- Gender: ⦿ All  ○ Male  ○ Female
- Relationship Status
  - ☒ All
  - ☒ Engaged
  - ☒ In a Relationship
  - ☒ Married
  - ☒ Single

Friends

Activity – Last 30 Days    By Friendlist (All Friends ▼)    (Filter)

| Friend | Rank | Status Posts | Posts to Friends | Check-Ins | Comments | Friend List | ents nded | Pages Endorsed |
|---|---|---|---|---|---|---|---|---|
| Joanna | 1 | 188 | 1 | 0 | 2 | ▶ All | 0 | 3 |
| Vaughn | 2 | 128 | 0 | 1 | 1 | Family | 0 | 7 |
| Coleen | 3 | 67 | 2 | 0 | 12 | Work | 0 | 4 |
| Kristine | 4 | 55 | 1 | 18 | 4 | Social | 1 | 1 |
| Sara | 4 | 33 | 0 | 6 | 26 |  | 2 | 1 |
| Danielle | 6 | 41 | 0 | 0 | 4 | 3 | 4 | 1 | 0 |
| Ed | 7 | 46 | 2 | 0 | 4 | 2 | 2 | 1 | 0 |
| Matt | 8 | 27 | 1 | 4 | 0 | 0 | 4 | 0 | 31 |

FIG. 5D

Friends

Communication – Last 30 Days    By Friendlist (All Friends ▼)    (Filter)

| Friend | Rank | Status Posts | Photo Posts | Video Posts | Link Posts | Check-Ins | Posts to Friends | Comments |
|---|---|---|---|---|---|---|---|---|
| Vaughn | 1 | 106 | 12 | 6 | 7 | 1 | 0 | 1 |
| Coleen | 2 | 27 | 15 | 1 | 26 | 0 | 2 | 12 |
| Joanna | 3 | 10 | 18 | 0 | 33 | 0 | 1 | 2 |
| Kristine | 4 | 15 | 5 | 1 | 34 | 1 | 1 | 4 |
| Ed | 5 | 37 | 0 | 0 | 11 | 0 | 2 | 4 |
| Julia | 6 | 40 | 4 | 0 | 0 | 0 | 1 | 3 |
| Sara | 7 | 2 | 10 | 0 | 3 | 18 | 0 | 26 |
| Danielle | 8 | 6 | 17 | 6 | 6 | 6 | 0 | 4 |

| Friend | Rank | General Posts Received | Birthday Posts Received | Game Posts Received | Friends Posting | Quality Event Invites |
|---|---|---|---|---|---|---|
| Vaughn | 1 | 128 | 0 | 0 | 24 | 8 |
| Joanna | 2 | 59 | 1 | 128 | 14 | 6 |
| Coleen | 3 | 65 | 2 | 0 | 8 | 3 |
| Kristine | 4 | 57 | 1 | 0 | 6 | 2 |
| Ed | 5 | 46 | 0 | 0 | 6 | 1 |
| Julia | 6 | 44 | 0 | 0 | 5 | 0 |
| Danielle | 7 | 41 | 0 | 0 | 5 | 0 |
| Chris | 8 | 37 | 0 | 0 | 3 | 0 |

FIG. 5E

| Friend | Rank | Status Posts | Comments Received | Friends Commenting | Endorsements Received | Friends Endorsing | Avg Responses per Post |
|---|---|---|---|---|---|---|---|
| Julia | 1 | 43 | 110 | 53 | 189 | 82 | 6.95 |
| Lesley | 2 | 9 | 25 | 24 | 70 | 58 | 10.56 |
| Brink | 3 | 5 | 8 | 8 | 38 | 35 | 9.20 |
| Brandon | 4 | 13 | 4 | 4 | 80 | 44 | 6.46 |
| Stephanie | 5 | 3 | 21 | 21 | 7 | 7 | 9.33 |
| Danielle | 6 | 41 | 41 | 41 | 84 | 43 | 3.05 |
| Kristyn | 7 | 2 | 0 | 0 | 25 | 19 | 12.50 |
| Darby | 8 | 15 | 36 | 36 | 32 | 22 | 4.53 |

FIG. 5F

| Cheer – Last 30 Days | | | By Friendlist All Friends ▼ | Filter |
|---|---|---|---|---|
| Friend | Rank | Status Posts | Happy Status Posts | Unhappy Status Posts |
| Jeanette | 1 | 16 | 6 | 1 |
| Vaughn | 1 | 106 | 12 | 4 |
| Heather | 3 | 7 | 3 | 0 |
| Ed | 3 | 37 | 3 | 0 |
| Sharon | 5 | 8 | 2 | 0 |
| Susan | 5 | 6 | 2 | 0 |
| Kristine | 5 | 15 | 2 | 0 |
| Tiffhany | 5 | 15 | 2 | 0 |

FIG. 5G

| My Fans – Last 30 Days | | | By Friendlist All Friends ▼ | Filter |
|---|---|---|---|---|
| Friend | Rank | Posts Received | Comments on My Posts | Endorsements on My Posts |
| Vaughn | 1 | 4 | 1 | 3 |
| Kristine | 2 | 2 | 2 | 3 |
| Ed | 3 | 1 | 2 | 5 |
| Kelly | 3 | 0 | 5 | 2 |
| Kay | 5 | 2 | 1 | 3 |
| Susan | 6 | 1 | 1 | 4 |
| Thomas | 7 | 1 | 1 | 1 |
| Brian | 8 | 0 | 1 | 1 |

FIG. 5H

| Friend | Current City | Age | Relationship Status | Last Update | Date |
|---|---|---|---|---|---|
| Aaron | Brooklyn | - | - | Happy Friday! | Mar 24 |
| Abbey | Columbia | - | - | Hot tea for my sore throat... | Apr 19 |
| Adam | Washington | - | - | Cool AND creepy. | Apr 16 |
| Alex | Knoxville | 34 | Married | I say it every year, but MLB Extra Innings is worth every penny | Apr 19 |
| Alissa | Boston | - | Married | yes. yes. yes. | Apr 19 |
| Andrew | Plano | 32 | In a Relationship | Allen Wranglers! | Apr 01 |
| Andy | Atlanta | 34 | Married | Just another 15 hour day at the office! :-) | Apr 17 |
| Ashley | Greenville | - | Married | We're on a boat! | Apr 17 |

FIG. 5K

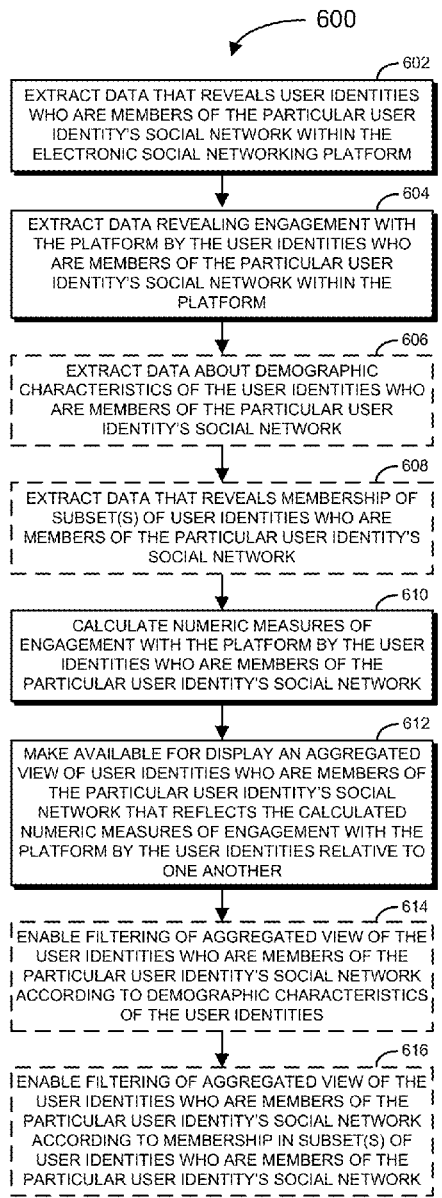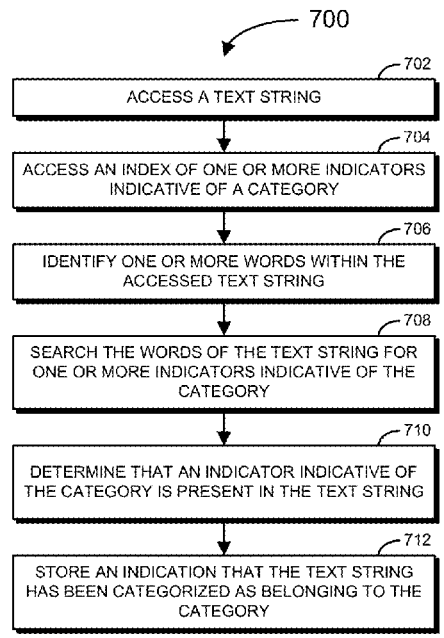
FIG. 6A
FIG. 7A

MEASURING ENGAGEMENT WITH A SOCIAL NETWORKING PLATFORM

CROSS-REFERENCE TO RELATED APPLICATION

This application claims priority from U.S. Provisional Patent Application Ser. No. 61/638,074, filed Apr. 25, 2012, and titled "MEASURING ENGAGEMENT WITH A SOCIAL NETWORKING PLATFORM," which is incorporated herein by reference in its entirety.

BACKGROUND

Electronic social networking platforms typically provide different mechanisms for enabling user identities to engage with the electronic social networking platforms.

BRIEF DESCRIPTION OF THE DRAWINGS

FIGS. 5A-5K are diagrams of examples of a GUI for a social intelligence application.

FIGS. 6A-6C, FIGS. 7A-7B, and FIGS. 8-9 are flow charts that illustrate examples of different processes.

DETAILED DESCRIPTION

Figure 1A:
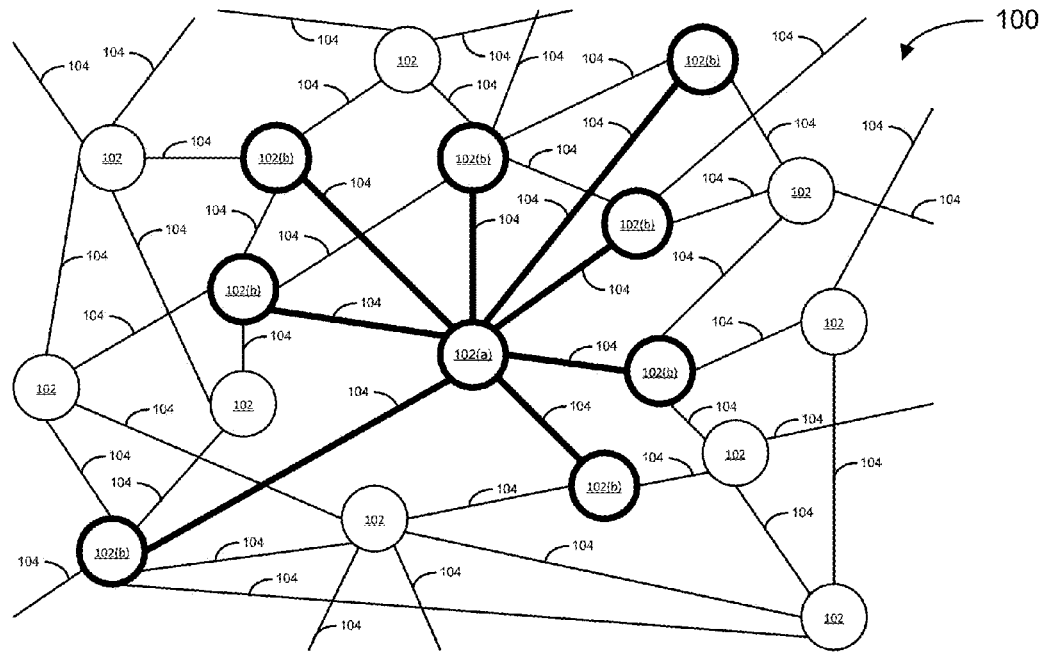
FIGS. 1A and 1B are schematic diagrams of examples of electronic social networking platforms.

In some implementations, data is extracted from an electronic social networking platform about a particular user identity of the electronic social networking platform. In addition, data also may be extracted from the electronic social networking platform about other user identities who are members of the particular user identity's social network within the electronic social networking platform. The extracted data then may be used to calculate numeric measures of the particular user identity's engagement with the electronic social networking platform and/or numeric measures of the other user identities' engagement with the electronic social networking platform. Information about the relative engagement of the other user identities with the electronic social networking platform then may be made available to the particular user identity (e.g., via an electronic device), and the particular user identity may be provided with the ability to manipulate the information. For example, the particular user identity may be provided with the ability to filter the information based on one or more demographic or other characteristics of the other user identities.

There are many different examples of electronic social networking platforms. Facebook, Twitter, LinkedIn, Google+, MySpace, and Orkut are just a few examples. But, there are many others, and it is reasonable to expect many more to be launched in the future. The techniques described herein for extracting and analyzing data from an electronic social networking platform are widely applicable and may be applied to any of the above electronic social networking platforms or any other electronic social networking platforms that enable data to be extracted.

Electronic social networking platforms frequently enable individual user identities (e.g., users who have registered with a platform and/or who have been assigned a unique or otherwise identifying identifier by the platform) to establish connections with other user identities. These connections between user identities may reflect relationships between the underlying human users who correspond to the user identities. For example, a connection between two user identities within an electronic social networking platform may reflect a social friendship (e.g., developed through physical interaction in the real-world and/or through on-line interaction in the cyber-world) or a professional relationship between the underlying human users who correspond to the user identities.

In some electronic social networking platforms, a user identity may be able to unilaterally form a connection with another user identity. For example, an electronic social networking platform may enable a first user identity to form a connection to a second user identity simply by specifying a desire to form a connection to the second user identity and without requiring approval of the connection by the second user identity. Alternatively, in other electronic social networking platforms, the formation of connections between two user identities may be a bilateral process. For example, in such electronic social networking platforms, when a first user identity specifies a desire to form a connection to a second user identity, the electronic social networking platform may establish the connection only after the second user identity approves the formation of the connection between the first user identity and the second user identity.

The connections formed between individual user identities within an electronic social networking platform may be represented in the form of a graph, where user identities are represented by nodes and connections between user identities are represented by edges connecting the nodes. Such a graph of interconnected user identities may change dynamically in time as new user identities join and old user identities quit the electronic social networking platform and/or as new connections are formed and old connections are dissolved. Proximity between two user identities of an electronic social networking platform may be measured in terms of degrees of separation between the two user identities. For example, proximity between two user identities of an electronic social networking platform may be calculated as the fewest number of edges required to form a path between the two user identities within the graph representing the connections between user identities of the electronic social networking platform.

A user identity of an electronic social networking platform may form a social network within the electronic social networking platform by forming connections to other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to include a group of other user identities that are within a threshold number of degrees of separation of the particular user identity within the graph.

Electronic social networking platforms commonly facilitate sharing of information and the exchange of electronic communications between user identities and other user identities who are part of their social networks. In some implementations, an electronic social networking platform may allow a particular user identity to access more detailed profile information about the other user identities who are part of the particular user identity's social network than the electronic social networking platform allows the particular user identity to access about user identities who are not part of the particular user identity's social network. For example, an electronic social networking platform may allow a particular user identity to access information about the hometowns and/or the current cities of residence of other user identities who are part of the particular user identity's social network, but the electronic social networking platform may not allow the particular user identity to access this same information for user identities who are not part of the particular user identity's social network.

Additionally or alternatively, an electronic social networking platform may provide communications conduits between a particular user identity and the other user identities who are part of the particular user identity's social network that the electronic social networking platform does not otherwise provide between the particular user identity and other user identities who are not part of the particular user identity's social network.

Furthermore, some electronic social networking platforms may enable user identities to record information within the electronic social networking platforms about locations they have visited. In addition, these electronic social networking platforms may enable a particular user identity to access such information about locations that members of the particular user identity's social network have registered with the social networking platforms. However, these electronic social networking platforms may not allow a particular user identity to access similar information about locations that other user identities who are not members of the particular user identity's social network registered with the social networking platforms. In some electronic social networking platforms, when a user identity registers a location that the user identity has visited, messages may be broadcast to members of the user identity's social network reporting that the user identity has registered the location as a location that the user identity has visited.

Some electronic social networking platforms provide event management services. Among other features, these event management services often enable user identities to generate events, invite other user identities to attend such events, and manage guest lists for the events (e.g., manage RSVPs to the events from the invited user identities indicating that the user identities will be attending, will not be attending, tentatively will be attending, etc.).

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection that has been formed between the two user identities that are represented by the connected nodes 102. For example, the edges 104 that connect node 102(*a*) to nodes 102(*b*) represent connections that have been formed within the electronic social networking platform between the user identity represented by node 102(*a*) and the other user identities represented by nodes 102(*b*).

As discussed above, in some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(*a*) would be defined as the group of other user identities represented by nodes 102(*b*).

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user identity of an electronic social networking platform may wish to define subsets of user identities within the particular user identity's social network that reflect other user identities with whom the particular user identity has a familial relationship, a professional relationship, or a social relationship. For ease of reference, such defined subsets of a particular user's social network may be referred to herein as "Friendlists."

As further discussed above, an electronic social networking application may facilitate the sharing of information and the exchange of electronic communications between a particular user identity and other user identities who are members of the particular user identity's social network. For example, referring to the electronic social networking platform represented in FIG. 1A, the electronic social networking application may provide mechanisms that facilitate the exchange of electronic communications between the user identity represented by node 102(*a*) and the user identities represented by nodes 102(*b*) who are part of the social network of the user identity represented by node 102(*a*). In some implementations, the electronic social networking application may provide a mechanism that enables the user identity represented by node 102(*a*) to send private electronic messages to any one or more of the user identities represented by nodes 102(*a*). Furthermore, the electronic social networking application also may provide a mechanism that enables the user identity represented by node 102(*a*) to broadcast an electronic message that is shared publicly with all (or some defined subset of all, such as, for example, one or more "Friendlists") of the user identities represented by nodes 102(*b*). Additionally or alternatively, the electronic social networking application may provide a mechanism that enables the user identity represented by node 102(*a*) to send a directed electronic message to a user identity that is represented by a particular one of nodes 102(*b*). In such cases, the recipient user identity of the directed message may determine whether this directed message is shared publicly with other user identities of the electronic social networking platform.

In addition to enabling user identities to establish connections to other user identities, some electronic social networking platforms enable user identities to establish connections with other types of objects. For example, some social networking platforms may enable user identities to record information about their hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms. In some cases, a user identity may be said to record a "check-in" with an electronic social networking platform when the user identity records information within the electronic social networking platform about a location the user identity has visited. Some electronic social networking platforms also may enable user identities to record "check-ins" on behalf of other user identities. For instance, some electronic social networking platforms may enable members of a particular user identity's social network to record a "check-in" on behalf of the particular user identity (e.g., when the user identities visit a location together). In such scenarios, the electronic social networking platform may record the location as a location the particular user identity visited even though the "check-in" at the location was not initiated by the particular user identity.

Additionally or alternatively, some social networking platforms may enable user identities to generate event objects within the electronic social networking platforms that represent events that they are hosting. After creating event objects for such events, user identities may be provided with mechanisms for inviting other user identities to the events. Furthermore, a connection may be established between an event object and a user identity within an electronic social networking platform as a result of the user identity being invited to the event and/or as a result of the user identity registering with the electronic social networking platform that the user identity will be attending the event.

Similarly, some social networking platforms may enable user identities to record endorsements of various different types of interests, for example, by establishing connections to interest objects that represent these interests. Such interest objects may include a variety of different types of objects including, for example, non-personal enterprise objects. Examples of such non-personal enterprise objects may include, among others, local businesses or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities. As described in greater detail below in connection with FIG. 3A, in some electronic social networking platforms, interest objects, including non-personal enterprise objects, may be manifested within the electronic social networking platforms as so-called "pages." These pages, especially pages associated with non-personal enterprise interest objects, may be maintained by one or more representatives of the interests or non-personal enterprises represented by the objects. In addition, among other features, these pages may provide information about the interests or non-personal enterprises represented by the objects. These pages also may provide conduits for enabling interaction between the interest or non-personal enterprise objects and the user identities that have formed connections to the objects that represent them. Furthermore, some electronic social networking platforms may enable pages, like user identities, to establish event objects related to events associated with the interest represented by the page.

Moreover, some social networking platforms may enable user identities to establish connections with independent applications that leverage the social networking platforms, for example, by granting the independent applications authorization to access or extract data from the electronic social networking platform on their behalf.

Figure 1B:
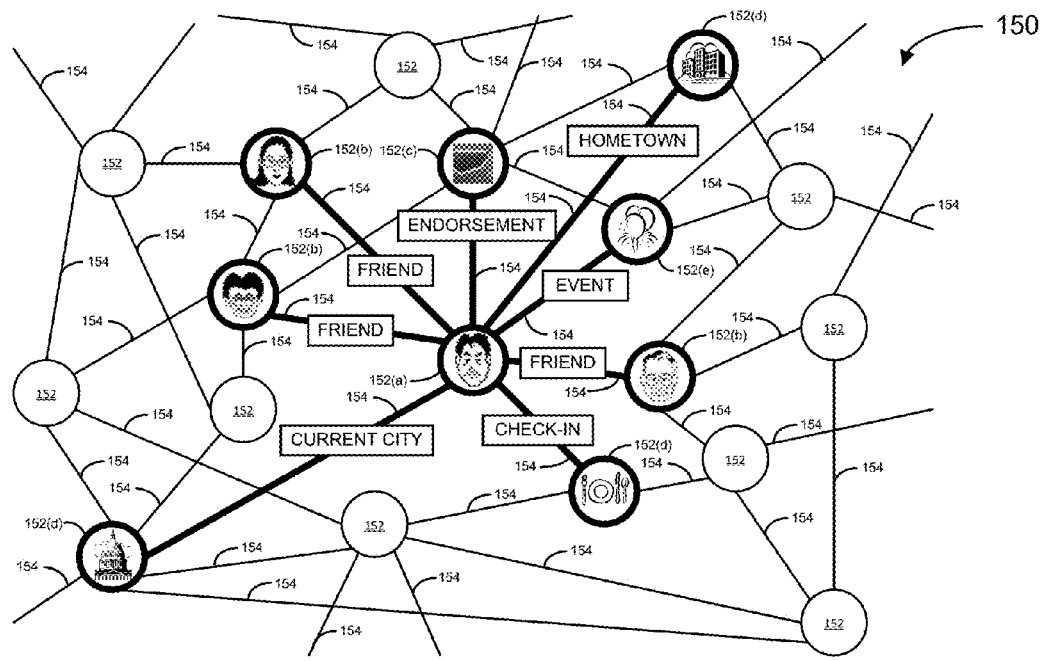

FIG. 1B is a schematic diagram of an example of an electronic social networking platform that enables user identities to form connections with multiple different types of objects including, for example, other user identity objects, location objects, event objects, and interest objects (e.g., non-personal enterprise objects). As illustrated in FIG. 1B, the electronic social networking platform is represented as a graph 150 of nodes 152 connected by edges. Each node 152 in the graph 150 represents a particular type of object in the electronic social networking platform. For example, nodes 152($a$) and 152($b$) represent user identity objects, while node 152($c$) represents a non-personal enterprise object, nodes 152($d$) represent location objects, and node 152($e$) represents an event object.

An edge 154 that connects two nodes 152 represents a connection that has been formed between the two objects that are represented by the connected nodes 152. For example, the edges 154 that connect node 152($a$) to nodes 152($b$) represent connections that have been formed between the user identity represented by node 102($a$) and the user identities represented by nodes 152($b$). (For ease of reference, such a connection between two user identity objects in an electronic social networking platform may be referred to herein as a "friend" connection.)

Similarly, the edge 154 that connects node 152($a$) to node 152($c$) represents a connection between the user identity represented by node 152($a$) and the non-personal enterprise object represented by node 152($c$). (As discussed above, a user of an electronic social networking platform may form a connection to such a non-personal enterprise object in order to record an endorsement of the non-personal enterprise represented by the object. Therefore, for ease of reference, connections between a user identity object and a non-personal enterprise object in an electronic social networking platform may be referred to herein as an "endorsement" connection.)

Furthermore, the edges 154 that connect node 152($a$) to nodes 152($d$) represent connections that have been formed between the user identity represented by node 152($a$) and the location objects represented by nodes 152($d$). Depending on the electronic social networking platform, a user identity may be able to establish various different types of connections to location objects.

For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" connection to a location object that represents the user identity's current residence.

Moreover, in order to store a record of a place the user identity visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a "check-in" connection to a location object that represents a place that the user identity visited. In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS) and/or map data available to the mobile computing device.

Finally, the edge 154 that connects node 152($a$) to node 152($e$) represents a connection that has been formed between the user identity represented by node 152($a$) and the event represented by event object 152($e$). (For ease of reference, such a connection between a user identity object and an event object may be referred to herein as "event" connections.) There may be various different types of event connections between user identities and event objects in a social networking platform. For example, one type of an event connection between a user identity and an event object in a social networking platform may signify that the user identity is the host of the event. Another type of an event connection between a user identity and an event object in a social networking platform may signify that the user identity has been invited to the event. Still another type of event connection between a user identity and an event object in a social networking platform may signify that the user identity has registered with the electronic social networking platform that the user identity will be attending the event. Yet another type of event connection between a user identity and an event object in a social networking platform may signify that the user identity has registered with the electronic social networking platform that the user identity will not be attending the event. Still one more type of event connection between a user identity and an event object in a social networking platform may signify that the user identity has registered with the electronic social networking platform that the user identity tentatively will be attending the event.

In some electronic social networking platforms that enable user identities to form connections with object types like location objects, event objects, and interest objects (e.g., non-personal enterprise objects), such location objects, event objects, and/or interest objects (e.g., non-personal enterprise objects) each may be associated with one or more representatives. Furthermore, the electronic social networking platforms may enable these representatives to interact with the user identities to whom the objects are connected using the manifestation of the object within the electronic social networking platform.

For example, as described in greater detail below in connection with FIG. 3A, a non-personal enterprise object within an electronic social networking platform may be manifested as a "page" that provides information about the non-personal enterprise that the object represents, and the electronic social networking platform may enable one or more designated representatives associated with the "page" to share information and exchange electronic communications with the user identities connected to the non-personal enterprise object in a manner in which such shared information or exchanged communications appear to involve the "page" as opposed to an individual user identity. In one particular example, the electronic social networking platform may provide a mechanism that enables one or more representatives associated with the non-personal enterprise to broadcast an electronic message that is shared publicly with all (or some defined subset of all) of the user identities to which the non-personal enterprise object is connected.

Additionally or alternatively, an event object within an electronic social networking platform also may be manifested as an "event page" that provides information about the event the object represents (e.g., date, time, and location information for the event), and the electronic networking platform may enable one or more designated representatives associated with the event (e.g., the hosts) to share information and exchange electronic communications with user identities who have been invited to the event via the "event page." In some electronic social networking platforms, both personal user identities and non-personal enterprise objects (and their representatives) may be able to create and host events.

Electronic social networking platforms often enable user identities to maintain user profiles or other collections of data that include information about the user identities to whom they correspond. Such a profile for an individual user identity of an electronic social networking platform may include, among other information, information about the user identity's hometown, current residence, age, gender, relationship status, educational background, and/or professional background. Additionally or alternatively, the profile for an individual user identity of an electronic social networking platform may include records of various different interests of the user identity (e.g., endorsements of non-personal enterprises or other interests).

In some electronic social networking platforms, at least some of the profile information recorded for an individual user identity may be represented by connections between the user identity and other types of objects within the electronic social networking platforms. For example, information about a user identity's hometown and/or current residence may be represented as a connection between the user identity and one or more different location objects, for example, as described above in connection with FIG. 1B. Additionally or alternatively, information about a user identity's interests may be represented as connections between the user identity and one or more different interest objects (e.g., non-personal enterprise objects), for example, as also described above in connection with FIG. 1B.

Some electronic social networking platforms provide mechanisms that enable independent applications to leverage the electronic social networking platforms to provide services to client computing devices that are in addition to the services provided by the electronic social networking platforms themselves. One common example of a type of independent application that leverages an electronic social networking platform is a gaming application. Such gaming applications often allow user identities to engage in interactive or multiplayer games that involve other user identities of the electronic social networking platforms that they leverage. Furthermore, in some cases, the gaming applications may transmit communications to user identities of the electronic social networking platforms within the electronic social networking platforms themselves. Additionally or alternatively, some gaming applications may enable user identities to transmit messages that originate within the gaming applications to other user identities of the electronic social networking platform that are delivered to the other user identities within the electronic social networking platform.

The different examples of electronic social networking platforms described above may provide various different types of user interfaces for interacting with the electronic social networking platforms. In one particular example, an electronic social networking platform may provide multiple different GUIs to a user identity to enable the user identity to interact with the underlying electronic social networking platform.

In this example, the electronic social networking platform may provide a first GUI to the user identity that (among other features) presents to the user identity a feed that includes: (i) electronic messages that have been shared with the user identity by other user identities who are members of the user identity's social network and/or by other types of objects (e.g., location, event, and interest objects) to which the user identity is connected; and/or (ii) information about activities engaged in within the context of the electronic social networking platform by other user identities who are members of the user identity's social network. (For ease of reference, this feed presented to a user identity in the first GUI provided by the electronic social networking platform may be referred to herein as the user identity's "news feed.")

In addition to the first GUI described above in connection with this example, the electronic social networking platform also may provide a second GUI to the user identity that (among other features) presents to the user identity a feed that includes: (i) electronic messages that have been shared by the personal user identity with members of the personal user identity's social network (either in a broadcast or a directed fashion); (ii) electronic messages that were shared with the user identity by members of the user identity's social network, or, in some cases by gaming applications that leverage the electronic social networking platform, and that were directed specifically to the user identity (that the user identity nevertheless may allow other members of the user identity's social network to view); and (iii) information about activities engaged in within the context of the electronic social networking platform by the user identity. (For ease of reference, this feed presented to a user identity in the second GUI provided by the electronic social networking platform may be referred to as the user identity's "personal feed.")

Figure 2A:
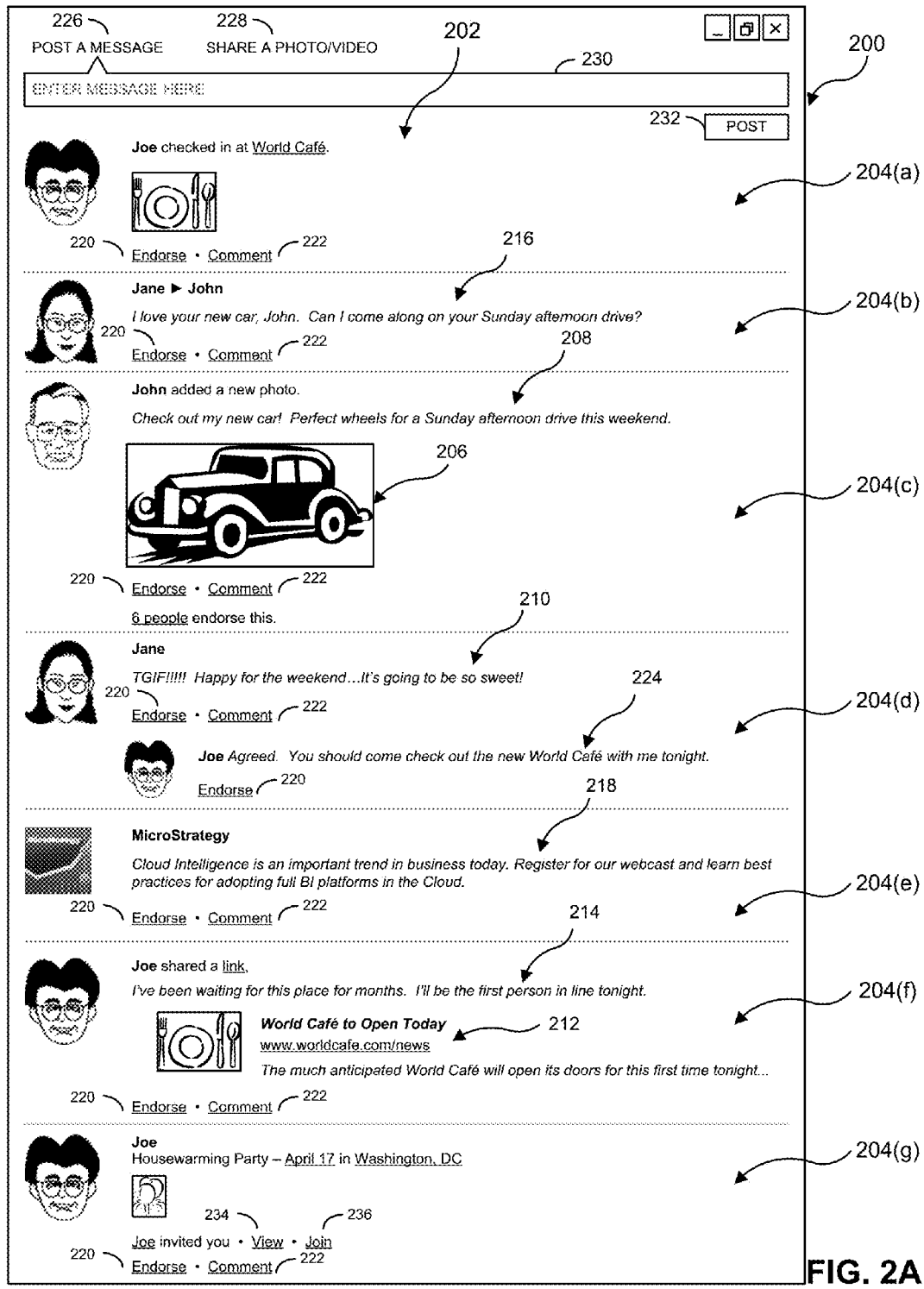
FIGS. 2A-2B and FIGS. 3A-3B are diagrams of examples of graphical user interfaces (GUIs) for an example of an electronic social networking platform.
Figure 2B:
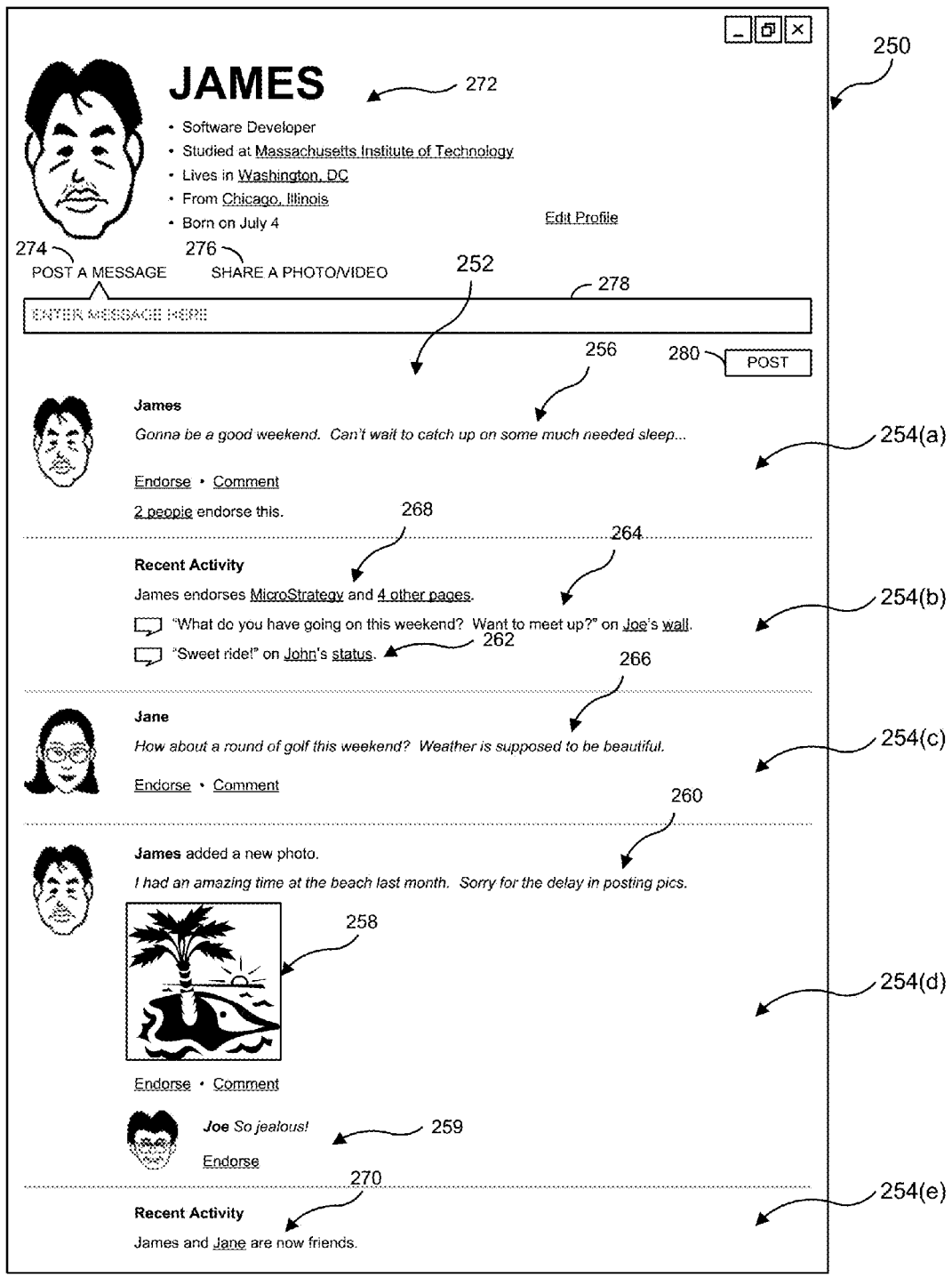

FIGS. 2A and 2B are diagrams of examples of two different GUIs 200 and 250, respectively, for an example of an electronic social networking platform. The GUI 200 presented in FIG. 2A illustrates an example of a GUI that presents a particular user identity's "news feed" 202 as described above, while the GUI 250 presented in FIG. 2B illustrates an example of a GUI that presents the particular user identity's "personal feed" 252 as described above.

Referring first to FIG. 2A, GUI 200 includes a "news feed" 202 that includes different feed items 204. The items 204 included within "news feed" 202 include content and/or electronic messages that have been shared with the particular user identity by other user identities who are members of the particular user identity's social network. For example, item 204(c) includes a picture 206 and a corresponding message 208 shared with the particular user identity by a member of the particular user identity's social network identified as John. Similarly, item 204(d) includes a message 210 shared with the particular user identity by a member of the particular user identity's social network identified as Jane, and item 204(f) includes a hyperlink 212 to a web page and a corresponding message 214 shared with the particular user identity by a member of the particular user identity's social network identified as Joe. Although not illustrated in FIG. 2A, in addition to enabling user identities to share pictures and hyperlinks with members of their social networks (e.g., as illustrated by items 204(c) and 204(f), respectively) the electronic social networking platform also may enable user identities to share other types of content with members of their social networks including, for example, videos.

Items 204(c), 204(d), and 204(f) may represent content and/or messages that the particular user identities who shared these items (i.e., John, Jane, and Joe, respectively) shared generally with multiple members of their own social networks. For ease of reference, messages and/or content that user identities share as general broadcast messages to multiple members of their social networks, such as, for example, picture 206 and corresponding message 208 of item 204(c), message 210 of item 204(d), and hyperlink 212 and corresponding message 214 of item 204(f), may be referred to herein as "status posts."

In addition to enabling user identities to send general broadcast messages to multiple members of their social networks, the electronic social networking platform also may enable user identities to send directed messages to individual user identities within their social networks. Such directed messages may be presented to the user identities to whom they are targeted within the targeted user identities' "personal feeds," and the electronic social networking platform may provide user identities with controls for configuring whether such directed messages also are shared with members of the targeted user identities' own social networks. In the event that a targeted user identity selects configuration settings that provide for directed messages to the targeted user to be shared with other members of the targeted user identity's social network, such directed messages may be presented to the other members of the targeted user identity's social network in their "news feeds."

Item 204(b) in the "news feed" 202 of the GUI 200 for a particular user identity of the electronic social networking platform is an example of a message 216 that was directed to a targeted user identity who is a member of the particular user identity's social network and who selected configuration settings that provided for the directed message to be shared with other members of the targeted user identity's own social network. More particularly, message 216 was directed to a member of the particular user identity's social network identified as John by another user identity identified as Jane. Because the user identity identified as John is a member of the particular user identity's social network and because the user identity identified as John selected configuration settings that provide for directed messages that target the user identity identified as John to be shared with other members of his social network, the directed message 216 from the user identity identified as Jane to the user identity identified as John is presented in the particular user identity's "news feed" 202. The user identity identified as Jane may or may not be a member of the particular user identity's own social network.

"News feed" 202 also includes information about activities engaged in within the context of the electronic social networking platform by other user identities who are members of the particular user identity's social network. For example, item 204(a) indicates that a user identity identified as Joe checked-in at a location identified as World Café. The location World Café may be represented as a location object within the electronic social networking platform and may correspond to, for example, a local restaurant.

The items 204 included within "news feed" 202 also include content and/or electronic messages that have been shared with the particular user identity by other types of objects (e.g., location, event, and interest objects) to which the user identity is connected. For example, item 204(e) includes a message 218 shared with the particular user identity by a non-personal enterprise object identified as MicroStrategy.

If the particular user identity is connected to a large number of non-personal enterprise objects (or other types of interest objects) that frequently share messages, the particular user identity's "news feed" 202 may be cluttered with messages shared by such non-personal enterprise objects (or other types of interest objects). Consequently, the particular user identity may miss, gloss over, or otherwise fail to appreciate messages posted by other user identities who are members of the particular user identity's social network. Additionally or alternatively, if a large number of items continuously cycle through the particular user identity's "news feed" 202, the particular user identity may miss, gloss over, or otherwise fail to appreciate messages of some level of significance to the particular user identity posted by other user identities who are members of the particular user identity's social network.

Invitations to events that a user identity receives within the electronic social networking platform also may be presented in the user identity's "news feed." For example, item 204(g) in "news feed" 202 represents an invitation to an event named "Housewarming Party" being held on April 17 in Washington, D.C. that was sent to the particular user identity by a user identity who is a member of the particular user identity's social network identified as Joe. As illustrated in FIG. 2A, item 204(g) includes a selectable "View" control 234 that, when invoked, may provide the particular user identity with more information about the "Housewarming Party" event. In addition, item 204(*g*) also includes a selectable "Join" control 236 that enables the particular user identity to register with the electronic social networking platform that the particular user identity will be attending the "Housewarming Party" event. As discussed above, the "Housewarming Party" event may be represented as an event object within the electronic social networking platform.

The items 204 presented in "news feed" 202 provide mechanisms that enable the particular user identity to react to the objects included within the items 204 presented in "news feed" 202. For example, as illustrated in FIG. 2A, each of the items 204 presented in "news feed" 202 includes a selectable "Endorse" control 220 and a selectable "Comment" control 222. A selectable "Endorse" control 220 in an item 204 enables the particular user identity to register an endorsement of the object(s) (e.g., content, message, and/or activity) included in the item 204. The electronic social networking platform records such endorsements and may present the number of endorsements registered in connection with the object(s) presented in an item 204 in connection with the presentation of the item itself. For example, item 204(*c*) includes an indication that six different user identities have registered endorsements of the picture and message included in item 204(*c*).

A selectable "Comment" control 222 in an item 204 enables the particular user identity to enter a responsive comment to the object(s) included in the item 204. The electronic social networking platform records such responsive comments and associates them with the object(s) included in the item so that the electronic social networking platform may present any such responsive comments in connection with the presentation of the item 204 itself. For example, item 204(*d*) includes a message 224 by a user identity identified as Joe that was entered in response to the message 210 originally shared by the user identity identified as Jane.

In addition to "news feed" 202, GUI 200 also includes a selectable "Post Message" control 226, a selectable "Share Photo/Video" control 228, and an associated text entry field 230 and selectable "Post" control 232. Selectable "Post Message" control 226 enables the particular user identity to compose and post a status message by entering text in associated text entry field 230 and invoking selectable "Post" control 232. Similarly, selectable "Share Photo/Video" control 228 enables the particular user identity to share a picture or a video and to compose and post a corresponding status message by entering text in associated text entry field 230 and invoking selectable "Post" control 232.

Referring now to FIG. 2B, GUI 250 includes a "personal feed" 252 that includes different feed items 254. The items 254 included within "personal feed" 252 include content and/or electronic messages that the particular user identity shared with other members of the particular user identity's social network. Such content and/or electronic messages may include status posts that the particular user identity broadcasted generally to multiple members of the particular user identity's social network, responsive comments that the particular user identity entered in response to content and/or messages shared by other user identities who are members of the particular user identity's social network, and directed messages that the particular user identity shared with specifically targeted individual user identity's who are members of the particular user identity's social network.

For example, item 254(*a*) includes a status post 256 that the particular user identity broadcasted generally to multiple members of the particular user identity's social network. Similarly, item 254(*d*) includes a picture 258 and a corresponding message 260 that the particular user identity broadcasted generally to multiple members of the particular user identity's social network. To the extent that members of the particular user identity's social network enter responsive comments to and/or endorse status posts that the particular user identity broadcasts generally to multiple members of the particular user identity's social network, any such responsive comments or endorsements also may be presented within "personal feed" 254. For example, item 254(*a*) includes an indication that two user identities have endorsed message 256. Similarly, item 254(*d*) includes a message 259 that was entered by a member of the particular user identity's social network identified by the user identity Joe in response to the picture 258 and corresponding message 260 originally posted by the particular user identity.

Meanwhile, item 254(*b*) includes a responsive comment 262 that the particular user identity entered in response to content and/or a message shared by a member of the particular user identity's social network identified by the user identity John. Item 254(*b*) also includes a directed message 264 that the particular user identity shared with a specifically targeted member of the particular user identity's social network identified by the user identity Joe.

The items 254 included in "personal feed" 252 also include content and/or messages that were shared with the particular user identity by members of the particular user identity's social network and that were directed specifically to the particular user identity. For example, item 254(*c*) includes a message 266 that was shared with the particular user identity by a member of the particular user identity's social network identified by user identity Jane and that was directed specifically to the particular user identity.

In addition, the items 254 in "personal feed" 252 also include information about activities engaged in by the particular user identity within the context of the electronic social networking platform. For example, item 254(*b*) includes an indication 268 that the particular user identity has endorsed a non-personal enterprise object identified as MicroStrategy as well as four additional interest objects, all of which, as described in greater detail below in connection with FIG. 3A, may be manifested within the electronic social networking platform in the form of individual "pages." Meanwhile, item 254(*e*) includes an indication 270 that the particular user identity has established a connection within the electronic social networking platform to the user identity identified as Jane.

Although not illustrated in FIG. 2B, a user identity's "personal feed" also may include content and/or messages that were shared with the particular user identity as a consequence of the user identity's interaction with an application (e.g., a gaming application) that leverages the electronic social networking platform. For example, in some cases, an application that leverages the electronic social networking application may post messages in the user identity's "personal feed." Additionally or alternatively, another user identity may originate a message to the user identity within an application that leverages the electronic social networking platform, and the application then may cause the message from the other user identity that originated within the application to be posted to the user identity's "personal feed."

In addition to "personal feed" 252, GUI 250 also includes a profile section 272 with profile information for the particular user identity. As illustrated in FIG. 2B, profile section 272 indicates that the particular user identity is identified by user identity James and includes profile information that specifies the particular user identity's professional background (software developer), alma mater (Massachusetts Institute of Technology), current residence (Washington, D.C.), hometown (Chicago), and birthday (July 4).

As with GUI 200, GUI 250 also includes a selectable "Post Message" control 274, a selectable "Share Photo/Video" control 276, and an associated text entry field 278 and selectable "Post" control 280. Selectable "Post Message" control 274 enables the particular user identity to compose and post a status message by entering text in associated text entry field 278 and invoking selectable "Post" control 280. Similarly, selectable "Share Photo/Video" control 276 enables the particular user identity to share a picture or a video and to compose and post a corresponding status message by entering text in associated text entry field 2278 and invoking selectable "Post" control 280.

Figure 3A:
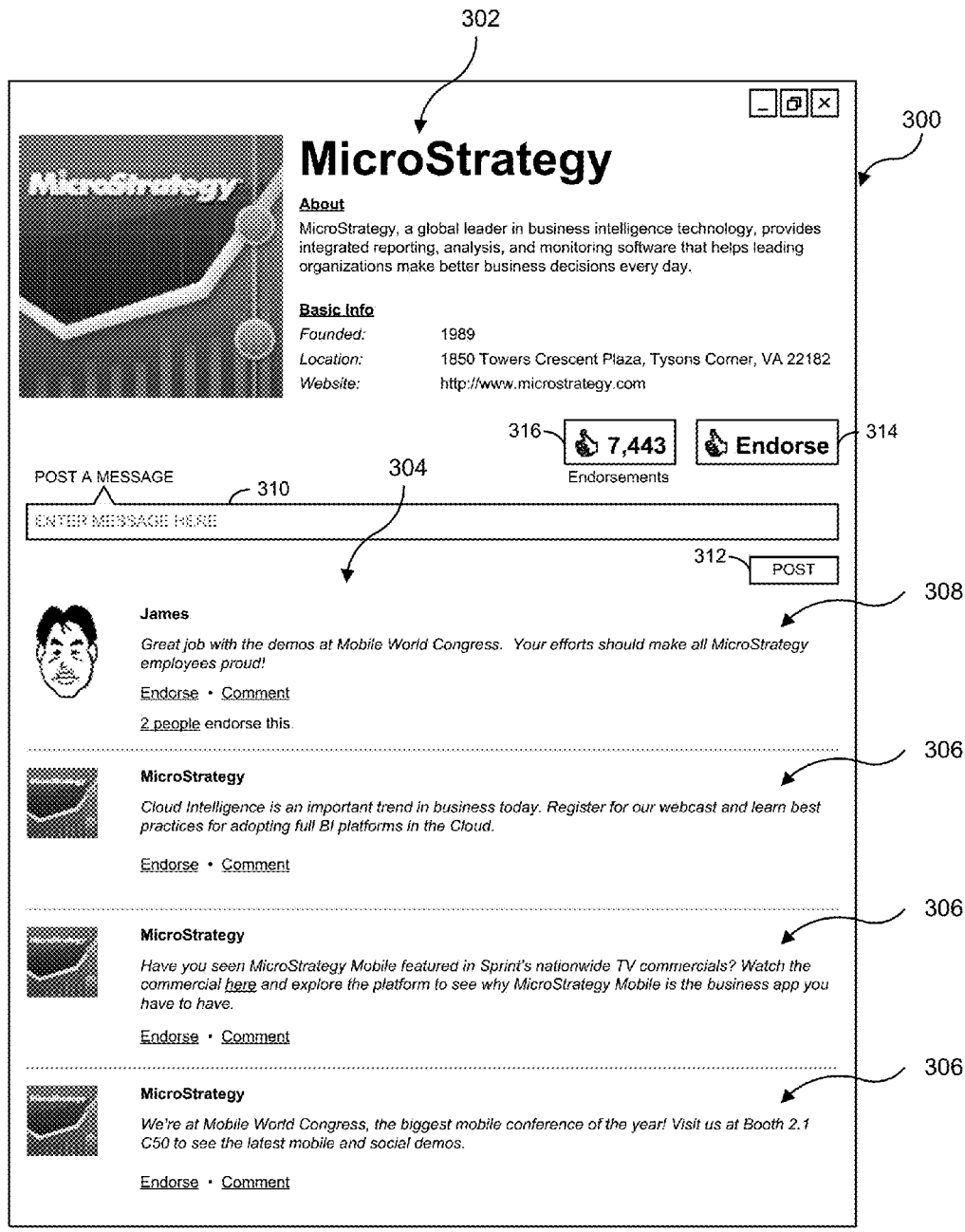

As discussed above, in some electronic social networking platforms, interests may be represented as interest objects that are manifested within the electronic social networking platform as "pages." FIG. 3A is a diagram of an example of a GUI 300 for an example of an electronic social networking platform within which interests are represented as interest objects that are manifested within the electronic social networking platform as pages. More particularly, GUI 300 is displaying an interest page 302 that represents an interest object for a non-personal enterprise identified as MicroStrategy. As illustrated in FIG. 3A, the MicroStrategy interest page includes an information section 303 that provides background information about MicroStrategy. The MicroStrategy interest page 302 also includes a feed 304 that includes, among other content, messages 306 generated by the MicroStrategy interest page and shared with one or more other user identities of the electronic social networking platform to which the MicroStrategy interest page 302 is connected (e.g., one or more user identities who have recorded with the electronic social networking platform endorsements of the MicroStrategy interest object represented by the MicroStrategy interest page 302). In addition, as further illustrated in FIG. 3A, the feed 304 also includes directed messages 308 posted to the MicroStrategy interest page 302 by user identities of the electronic social networking platform. For example, a user identity of the electronic social networking platform may post a message to the MicroStrategy interest page 302 by entering text in text entry field 310 and invoking selectable "Post" control 312. Although not illustrated as such in FIG. 3A, feed 304 also may include various additional or alternative types of content.

Notably, MicroStrategy interest page 302 also includes a selectable "Endorse" control 314 that enables user identities who view the MicroStrategy interest page 302 and who have not already endorsed MicroStrategy to record an endorsement of MicroStrategy as one of their interests. In response to invocation of selectable endorse control 314 by a particular user identity, the electronic social networking platform records that the particular user identity has endorsed MicroStrategy as an interest, for example, by establishing a connection between the object that represents the particular user identity in the platform and the interest object that represents MicroStrategy within the electronic social networking platform. MicroStrategy interest page 302 also includes an indication 316 reporting that 7,443 user identities already have endorsed MicroStrategy within the electronic social networking platform.

In some electronic social networking platforms, interests endorsed by a particular user identity may be shared with or otherwise made available to other user identities of the electronic social networking platform. In particular, in some electronic social networking platforms, interests endorsed by a particular user identity may be shared with other user identities who are members of the particular user identity's social network. For example, an electronic social networking platform may provide user identities who are members of a particular user identity's social network with access to a detailed user identity profile page that includes, among other information, indications of interests that the particular user identity has endorsed within the electronic social networking platform.

Figure 3B:
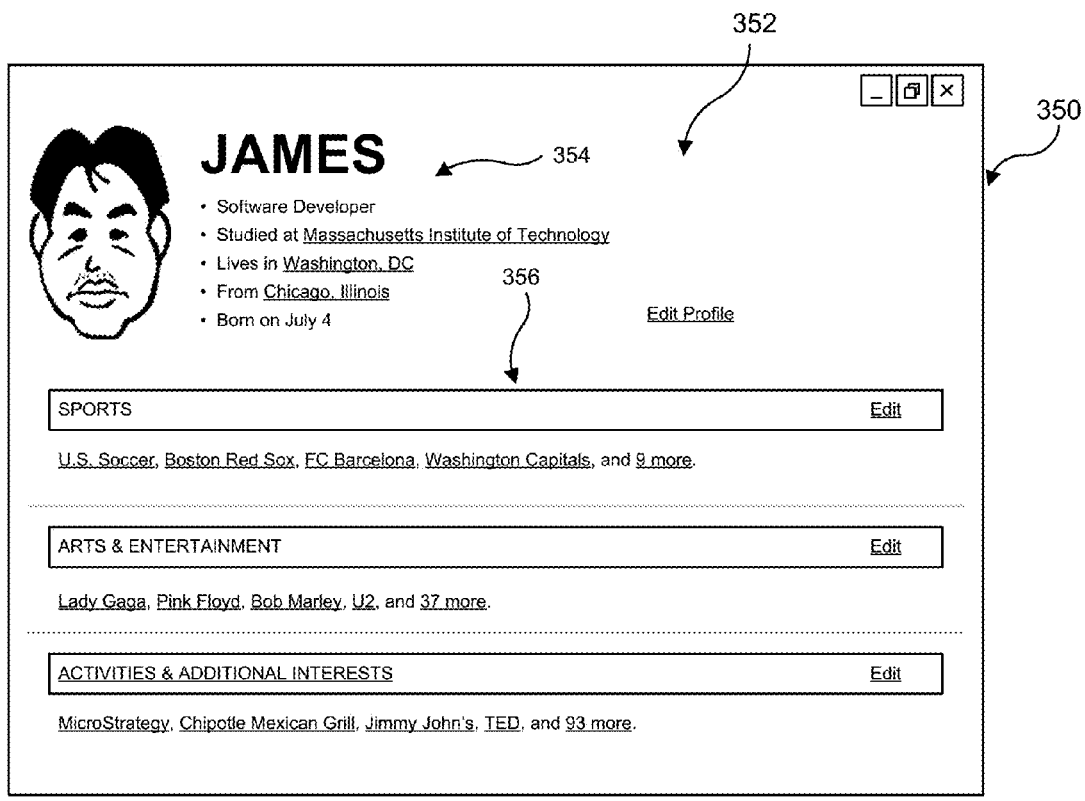

FIG. 3B is a diagram of an example of a GUI 350 for an example of an electronic social networking platform that provides user identities who are members of a particular user identity's social network with access to a detailed user identity profile. In particular, GUI 350 is displaying a detailed profile page 352 for a user identity of the electronic social networking platform identified as James. As illustrated in FIG. 3B, the detailed profile page 352 includes a biographic details section 354 that reports certain biographic information about the particular user identity including the particular user identity's job title (software developer), alma mater (Massachusetts Institute of Technology), current residence (Washington, D.C.), hometown (Chicago), and birthday (July 4). In addition, the detailed profile page 352 also includes an interests section 356 that lists various different interests that the particular user identity has endorsed within the electronic social networking platform. As illustrated in FIG. 3B, one of the interests that the particular user identity has endorsed within the electronic social networking platform is MicroStrategy. The particular user identity may have recorded his endorsement of MicroStrategy by invoking the "Endorse" control 314 included in the MicroStrategy interest page 302 as illustrated in FIG. 3A.

A social intelligence application that is external to an electronic social networking platform but that, nevertheless, leverages the electronic social networking platform may extract data from the electronic social networking platform that is available to different user identities of the electronic social networking platform. Thereafter, the social intelligence service may process the extracted content and represent the extracted content and/or generate reports about the extracted content so as to enable the individual user identities to glean better intelligence from the data that is available to them within the electronic social networking platform.

For example, as described in greater detail below, a social intelligence application may extract data about a particular user identity and other user identities who are members of the particular user identity's social network from an electronic social networking platform. The social intelligence application then may process this extracted data to determine relative measures of engagement with the electronic social networking platform by the other user identities who are members of the particular user identity's social network within the electronic social networking platform. Consequently, the social intelligence application may enable the particular user identity to identify members of the particular user identity's social network who are particularly active, communicative, popular, and/or influential within the context of the electronic social networking platform. Additionally or alternatively, the social intelligence application also may enable the particular user identity to gain a better understanding of the frequency with which the particular user identity interacts with individual members of the particular user identity's social network within the context of the electronic social networking platform.

Figure 4:
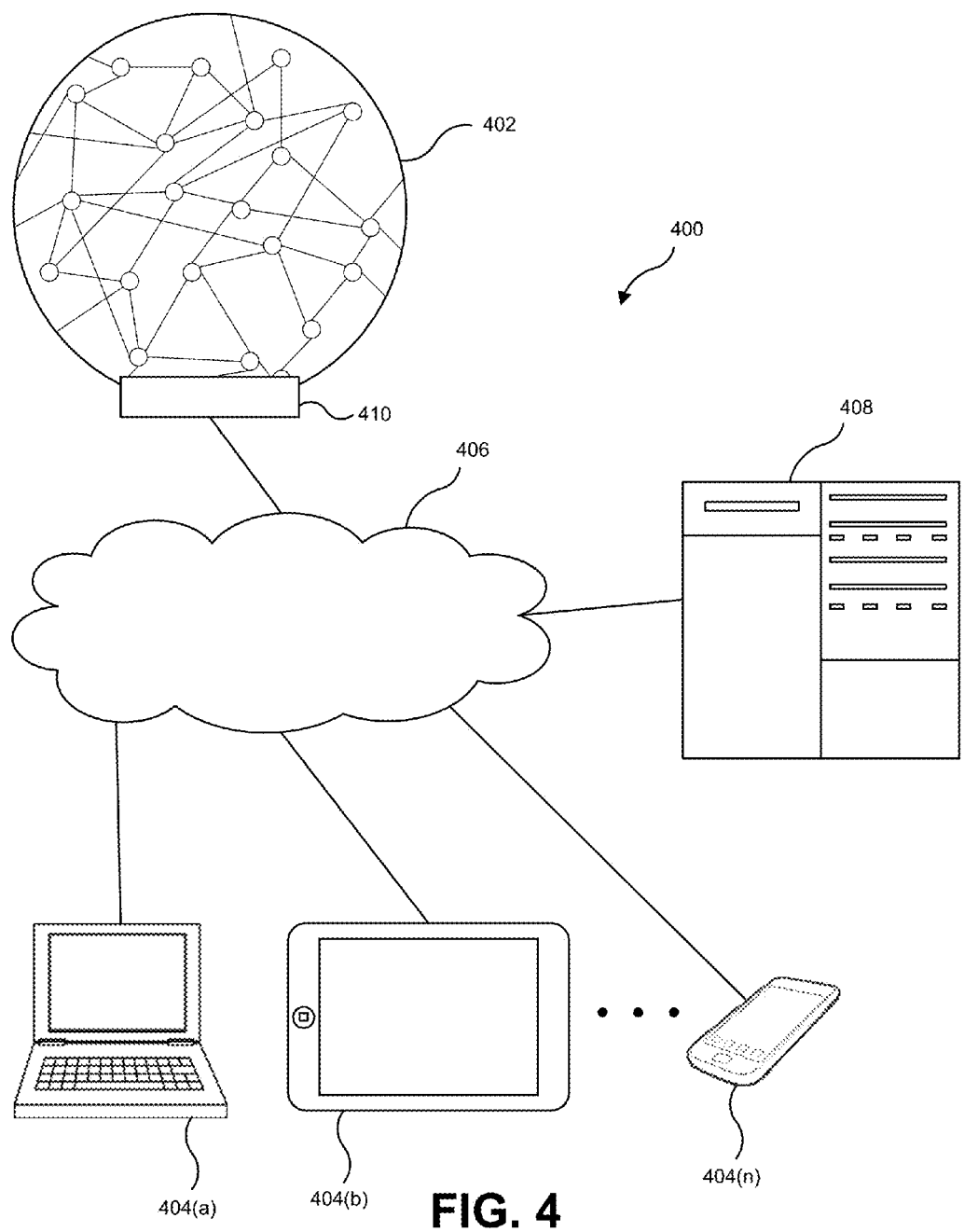
FIG. 4 is a block diagram of an example of a communications system.

FIG. 4 is a block diagram of an example of a communications system 400. For illustrative purposes, several elements illustrated in FIG. 4 and described below are represented as monolithic entities. However, these elements each may include and/or be implemented on numerous interconnected computing devices and other components that are designed to perform a set of specified operations.

As illustrated in FIG. 4, communications system 400 includes an electronic social networking platform 402 that is accessible to a number of computing devices 404(a)-404(n), including, for example, a laptop computer 404(a), a tablet computer 404(b), and a smartphone 404(n), over a network 406. In addition, communications system 400 also includes a computing system 408. Computing system 408 may be external to electronic social networking platform 402. As such, electronic social networking platform 402 may be accessible to computing system 408 over network 406. Additionally, computing system 408 may be accessible to computing devices 404(a)-404(n) over network 406.

Electronic social networking platform 402 may be implemented using one or more computing devices (e.g., servers) configured to provide a service to one or more client devices (e.g., computing devices 404(a)-404(n)) connected to electronic social networking platform 402 over network 406. The one or more computing devices on which electronic social networking platform 402 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 402. Furthermore, the one or more computing devices on which electronic social networking platform 402 is implemented each may include one or more processors for executing instructions stored in storage and/or received from one or more other electronic devices, for example over network 406. In addition, these computing devices also typically may include network interfaces and communication devices for sending and receiving data. Electronic social networking platform 402 also may provide an application programming interface (API) 410 that enables other applications to interact with and extract data from the electronic social networking platform 402.

Computing devices 404(a)-404(n) may be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. Each of the computing devices 404(a)-404(n) typically may have internal or external storage components for storing data and programs such as an operating system and one or more application programs. In particular, the internal or external storage components for each of the computing devices 404(a)-404(n) may store a client application for interfacing with electronic social networking platform 402 and/or a client application for interfacing with computing system 408. Additionally or alternatively, computing devices 404(a)-404(n) may be configured to interface with electronic social networking platform 402 or computing system 408 without a specific client application, using, for example, a web browser.

Each of the computing devices 404(a)-404(n) also typically may include a central processing unit (CPU) for executing instructions stored in storage and/or received from one or more other electronic devices, for example over network 406. Each of the computing devices 404(a)-404(n) also usually may include one or more communication devices for sending and receiving data. One example of such communications devices is a modem. Other examples include antennas, transceivers, communications cards, and other network adapters capable of transmitting and receiving data over a network (e.g., network 406) through a wired or wireless data pathway.

Network 406 may provide direct or indirect communication links between electronic social networking platform 402, computing devices 404(a)-404(n), and computing system 408. Examples of network 406 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing system 408 may be implemented using one or more computing devices (e.g., servers). The one or more computing devices on which computing system 408 is implemented may have internal or external storage components storing data and programs such as an operating system and one or more application programs. The one or more application programs may be implemented as instructions that are stored in the storage components and that, when executed, cause the one or more computing devices to provide the features ascribed herein to the computing system 408. Furthermore, the one or more computing devices on which computing system 408 is implemented each may include one or more processors for executing instructions stored in storage and/or received from one or more other electronic devices, for example, over network 406. In addition, these computing devices also typically may include network interfaces and communication devices for sending and receiving data.

Computing system 408 hosts a social intelligence application. As such, computing system 408 is configured to extract and process data from one or more electronic social networking platforms (e.g., electronic social networking platform 402). For example, computing system 408 may be configured to exploit API 410 to extract data from electronic social networking platform 402. Among other features, computing system 408 may be configured to extract data about multiple different user identities' social networks including (i) information about the members of each user identity's social network; (ii) communications shared with each user identity as well as communications shared with each member of the user identity's social network; (iii) information about interest objects that each user identity has endorsed as well as information about interest objects that each member of the user identity's social network has endorsed; (iv) information about locations where each user identity has checked-in as well as information about locations where each member of the user identity's social network has checked-in; and (v) information about events to which each user identity has been invited as well as information about events to which each member of the user identity's social network has been invited.

In some implementations, electronic social networking platform 402 may enable individual user identities to grant computing system 408 a token that defines permission levels related to data about the user identities' social networks that computing system 408 may access and extract from electronic social networking platform 402. For each individual user identity for which computing system 408 has a token, computing system 408 may extract information about the user identity and the other user identities who are members of the user identity's social network. This information may include identifying information for the user identity and each member of the user identity's social network as well as demographic information for the user identity and each member of the user identity's social network (e.g., hometown, current residence, age (or date of birth), gender, relationship status, etc.). For each individual user identity for which computing system 408 has a token, computing system 408 also may extract communications that the user identity shared with other user identities as well as communications that have been shared with the user identity. In addition, for each individual user identity for which computing system 408 has a token, computing system 408 also may extract information about interest objects the user identity has endorsed, information about locations where the user identity has checked-in, information about events to which the user identity has been invited, and/or information about applications that leverage the electronic social networking platform 402 that the user identity uses. Additionally or alternatively, for each individual user identity for which computing system 408 has a token, computing system 408 also may extract communications that members of the user identity's social network have shared with other user identities as well as communications that other user identities shared with members of the user identity's social network. In addition, for each individual user identity for which computing system 408 has a token, computing system 408 also may extract information about interest objects that members of the user identity's social network have endorsed, information about locations where members of the user identity's social network have checked-in, information about events to which members of the user identity's social network have been invited, and/or information about applications that leverage the electronic social networking platform 402 that the members of the user identity's social network use.

In some implementations, after extracting data from electronic social networking platform 402, computing system 408 may store the extracted data in one more databases. For example, computing system 408 may store information extracted from electronic social networking platform 402 in one or more on-line transaction processing (OLTP) databases. Such OLTP databases may be implemented as relational or other forms of databases Computing system 408 then may process the extracted data stored in the database(s) and load the processed data into a data warehouse (e.g., an on-line analytical processing (OLAP) data warehouse) that may facilitate reporting and analysis of the processed data. Computing system 408 then may provide individual user identities for which computing system 408 has tokens with access to subsets of the processed data that correspond to data extracted from electronic social networking platform 402 using their tokens.

For example, for each individual user identity for which computing system 408 has a token, computing system 408 may process data extracted from the electronic social networking platform 402 to determine relative measures of engagement with the electronic social networking platform 402 by members of the user identity's social network within the electronic social networking platform 402. The computing system 408 then may provide the individual user identities with access to information about the relative measures of engagement with the electronic social networking platform 402 by members of their social networks.

The individual user identities may utilize various different computing devices (e.g., computing devices 404(*a*)-404(*n*)) communicatively coupled to computing system 408 via network 406 to access the subsets of the processed data made available to the user identities by computing system 408. In addition to providing individual user identities with access to the processed data, computing system 408 also may provide these individual user identities with various analysis and reporting tools for manipulating the data included within the subsets of the processed data to which the individual user identities are provided access. Additionally or alternatively, such analysis and reporting tools may be provided within a client application resident on a computing device that an individual user identity uses to access the processed data made available by computing system 408.

Among other reporting and analysis tools, computing system 408 (and/or the client application used to access computing system 408) may provide the user identities with filtering tools that enable the user identity to identify different segments of members within the user identity's social network (e.g., based on demographic characteristics such as current residence, age, gender, and/or relationship status) and analyze the engagement with the electronic social networking platform 402 of the members of the different segments of the user identity's social network.

A social intelligence application that provides individual user identities of an electronic social networking platform with access to the extracted and processed data as described above and/or that provides the individual user identities with reporting and analysis tools for manipulating such extracted and processed data may enable the individual user identities to glean better intelligence from the wealth of data available to them within the electronic social networking platform.

FIGS. 5A-5K are diagrams of examples of a GUI 500 for a social intelligence application that analyzes the engagement of different user identities with an electronic social networking platform.

Referring first to FIG. 5A, GUI 500 provides an aggregated view of user identities who are members of a particular user identity's social network within an electronic social networking platform that reflects relative levels of activity within the electronic social networking platform for user identities who are members of the particular user identity's social network. In particular, GUI 500 presents a list of user identities (column 502) who are members of the particular user identity's social network ranked (column 504) according to numeric measures of the user identities' activity levels within the electronic social networking platform over the previous 30 days. In addition, GUI 500 presents various different statistics about each of the listed user identities' activity within the electronic social networking platform over the previous 30 days that the social intelligence application uses to calculate numeric measures of the user identities' activity levels within the electronic social networking platform.

More particularly, GUI 500 presents the number of status posts (column 506) the user identities broadcasted generally to their social networks; the number of targeted posts (column 508) the user identities directed to members of their social networks; the number of different locations at which the user identities checked-in (column 510); the number of comments (column 512) the user identities posted in response to other communications exchanged within the electronic social networking platform; the number of communications exchanged within the electronic social networking platform that the user identities endorsed (column 514); the number of applications (column 516) that leverage the electronic social networking platform that the user identities installed; the number of events (column 518) that occurred for which the user identities received and accepted invitations within the electronic social networking platform; and the number of pages endorsed (column 520) by the user identities.

As discussed above, the social intelligence application is configured to extract from the electronic social networking platform data about individual user identities of the electronic social networking platform and the members of their social networks within the electronic social networking platform. Thus, at some point prior to presenting the activity level information for members of the particular user identity's social network that is displayed in GUI 500 of FIG. 5A to the particular user identity, the social intelligence application extracts the following data for individual user identities who are members of the particular user identity's social network from the electronic social networking platform: status posts generally broadcast by the user identities to their social networks within the previous 30 days; targeted posts the user identities directed to members of their social networks within the previous 30 days; locations at which the user identities checked-in within the previous 30 days; responsive comments that the user identities posted within the previous 30 days; endorsements by the user identities of communications exchanged within the electronic social networking platform within the previous 30 days; indications of applications that leverage the electronic social networking platform that the user identities installed within the previous 30 days; indications of events that occurred within the previous 30 days for which the user identities received and accepted invitations within the electronic social networking platform; and indications of pages endorsed by the user identities within the previous 30 days.

After extracting this data from the electronic social networking platform, the social intelligence application processes this data to, among other things, count the number of status posts generally broadcast by the user identities to their social networks within the previous 30 days; the number of targeted posts the user identities directed to members of their social networks within the previous 30 days; the number of locations at which the user identities checked-in within the previous 30 days; the number of responsive comments that the user identities posted within the previous 30 days; the number of endorsements by the user identities of communications exchanged within the electronic social networking platform within the previous 30 days; the number of indications of applications that leverage the electronic social networking platform that the user identities installed within the previous 30 days; the number of events that occurred within the previous 30 days for which the user identities received and accepted invitations within the electronic social networking platform; and the number of pages endorsed by the user identities within the previous 30 days.

The social intelligence application then may calculate numeric measures of the level of activity within the electronic social networking platform for the individual user identities as a function of one or more of these values. For example, in some implementations, the social intelligence application may calculate numeric measures of the level of activity within the electronic social networking platform for the individual user identities according to the following formula:

Activity Level=2·(# status posts)+2·(# targeted posts)+ 2·(# checkins)+(# comments)+0.5·(# comms. endorsed)+3·(# apps installed)+2·(# events attended)+(# pages endorsed)

After calculating numeric measures of the level of activity within the electronic social networking platform for individual user identities who are members of the particular user identity's social network, the social intelligence application then may use these numeric measures to rank the individual user identities who are members of the particular user identity's social network according to their activity levels within the electronic social networking platform.

Depending upon the screen real estate available, the user identities presented within the view provided by GUI 500 as illustrated in FIG. 5A may extend beyond the visible borders of the GUI 500. Consequently, GUI 500 may enable a user to scroll the view up or down in order to see additional user identities presented by the GUI 500 in the view illustrated in FIG. 5A. Furthermore, GUI 500 provides selectable controls that enable the particular user identity to whom GUI 500 is presented to specify filters that should be applied to the user identities of the particular user identity's social network for whom the social intelligence application presents activity statistics within GUI 500. More particularly, GUI 500 provides a selectable "Filter" control 522 and a selectable "By Friendlist" control 524.

As illustrated in FIG. 5B, in response to invocation of selectable "Filter" control 522, GUI 500 presents a filter menu 526 that provides controls that enable the particular user identity to specify that the user identities who are members of the particular user identity's social network for whom activity statistics are presented within GUI 500 should be filtered according to one or more of (i) the city, state, and/or country of the current residences of user identities who are members of the particular user identity's social network who have endorsed the pages; (ii) the ages of the user identities who are members of the particular user identity's social network who have endorsed the pages; (iii) the gender of the user identities who are members of the particular user identity's social network who have endorsed the pages; and (iv) the relationship status of the of the user identities who are members of the particular user identity's social network who have endorsed the pages. In response to manipulation of the filter controls provided within filter menu 526 by the particular user identity, the social intelligence application accesses extracted information about the user identities who are members of the particular user identity's social network and filters the user identities for whom activity information is presented within GUI 500 to include only user identities who are members of the particular user identity's social network who satisfy the demographic criteria specified by the particular user identity using filter menu 526.

Referring now to FIG. 5C, in response to invocation of selectable "By Friendlist" control 524, GUI 500 presents a filter menu 528 that provides controls that enable the particular user identity to specify that the user identities who are members of the particular user identity's social network for whom activity statistics are presented within GUI 500 should be filtered to include only user identities who belong to designated subgroups of the particular user identity's social network that the particular user identity previously identified. In response to manipulation of the filter controls provided within filter menu 528 by the particular user identity, the social intelligence application accesses extracted information about the membership of subgroups of the particular user identity's social network and filters the user identities for whom activity statistics are presented within GUI 500 to include only user identities who belong to the designated subgroup(s) of the particular user identity's social network selected by the particular user identity using filter menu 528.

Referring now to FIG. 5D, GUI 500 provides an aggregated view of user identities who are members of the particular user identity's social network within the electronic social networking platform that reflects relative levels of communication within the electronic social networking platform for user identities who are members of the particular user identity's social network. In particular, GUI 500 presents a list of user identities (column 530) who are members of the particular user identity's social network ranked (column 532) according to numeric measures of the user identities' communication levels within the electronic social networking platform over the previous 30 days. In addition, GUI 500 presents various different statistics about each of the listed user identities' communication within the electronic social networking platform over the previous 30 days that the social intelligence application uses to calculate numeric measures of the user identities' communication levels within the electronic social networking platform.

More particularly, GUI 500 presents the number of general status posts (column 534) the user identities broadcasted generally to their social networks (e.g., status posts that do not include pictures, videos, or links); the number of photo status posts (column 536) the user identities broadcasted generally to their social networks; the number of video status posts (column 538) the user identities broadcasted generally to their social networks; the number of link status posts (column 540) the user identities broadcasted generally to their social networks; the number of different locations at which the user identities checked-in (column 542); the number of targeted posts (column 544) the user identities directed to members of their social networks; and the number of comments (column 546) the user identities posted in response to other communications exchanged within the electronic social networking platform.

As discussed above, the social intelligence application is configured to extract from the electronic social networking platform data about individual user identities of the electronic social networking platform and the members of their social networks within the electronic social networking platform. Thus, at some point prior to presenting the communication level information for members of the particular user identity's social network that is displayed in GUI 500 of FIG. 5D to the particular user identity, the social intelligence application extracts the following data for individual user identities who are members of the particular user identity's social network from the electronic social networking platform: general status posts the user identities broadcasted generally to their social networks within the previous 30 days; photo status posts the user identities broadcasted generally to their social networks within the previous 30 days; video status posts the user identities broadcasted generally to their social networks within the previous 30 days; link status posts the user identities broadcasted generally to their social networks within the previous 30 days; indications of different locations at which the user identities checked-in within the previous 30 days; targeted posts the user identities directed to members of their social networks within the previous 30 days; and responsive comments the user identities posted within the previous 30 days.

After extracting this data from the electronic social networking platform, the social intelligence application processes this data to, among other things, count the number of general status posts the user identities broadcasted generally to their social networks within the previous 30 days; the number of photo status posts the user identities broadcasted generally to their social networks within the previous 30 days; the number of video status posts the user identities broadcasted generally to their social networks within the previous 30 days; the number of link status posts the user identities broadcasted generally to their social networks within the previous 30 days; the number of different locations at which the user identities checked-in within the previous 30 days; the number of targeted posts the user identities directed to members of their social networks within the previous 30 days; and the number of responsive comments the user identities posted within the previous 30 days.

The social intelligence application then may calculate numeric measures of the level of communication within the electronic social networking platform for the individual user identities as a function of one or more of these values. For example, in some implementations, the social intelligence application may calculate numeric measures of the level of communication within the electronic social networking platform for the individual user identities according to the following formula:

$$\text{Comm. Level} = 2 \cdot (\text{\# status posts} + \text{\# photo posts} + \text{\# link posts} + \text{\# video posts} + \text{\# checkins}) + (\text{\# comments})$$

After calculating numeric measures of the level of communication within the electronic social networking platform for individual user identities who are members of the particular user identity's social network, the social intelligence application then may use these numeric measures to rank the individual user identities who are members of the particular user identity's social network according to their communication levels within the electronic social networking platform.

As illustrated in FIG. 5D, GUI 500 also provides selectable "Filter" control 522 and selectable "By Friendlist" control 524 for filtering the user identities for whom communication statistics are presented in GUI 500 in the same manner as described above in connection with FIGS. 5A-5C. Furthermore, depending upon the screen real estate available, the user identities presented within the view provided by GUI 500 as illustrated in FIG. 5D may extend beyond the visible borders of the GUI 500. Consequently, GUI 500 may enable a user to scroll the view up or down in order to see additional user identities presented by the GUI 500 in the view illustrated in FIG. 5D.

Referring now to FIG. 5E, GUI 500 provides an aggregated view of user identities who are members of the particular user identity's social network within the electronic social networking platform that reflects relative levels of popularity within the electronic social networking platform for user identities who are members of the particular user identity's social network. In particular, GUI 500 presents a list of user identities (column 548) who are members of the particular user identity's social network ranked (column 550) according to numeric measures of the user identities' popularity within the electronic social networking platform over the previous 30 days. In addition, GUI 500 presents various different statistics about each of the listed user identities' engagement with the electronic social networking platform over the previous 30 days that the social intelligence application uses to calculate numeric measures of the user identities' popularity within the electronic social networking platform.

More particularly, GUI 500 presents the number of general targeted posts (column 552) directed to the user identities (e.g., non-birthday-related targeted posts directed to the user identities); the number of birthday-related targeted posts (column (554) directed to the user identities; the number of targeted posts directed to the user identities that originated from gaming applications (column 556) that leverage the electronic social networking platform; the number of unique members of the user identities' social networks who directed targeted posts to the user identities (column 558); and the number of quality event invitations (column 560) the user identities received. The social intelligence application may classify an event as a quality event if at least some threshold percentage (e.g., 10%) of the invitees to the event accept their invitations.

As discussed above, the social intelligence application is configured to extract from the electronic social networking platform data about individual user identities of the electronic social networking platform and the members of their social networks within the electronic social networking platform. Thus, at some point prior to presenting the popularity information for members of the particular user identity's social network that is displayed in GUI 500 of FIG. 5E to the particular user identity, the social intelligence application extracts the following data for individual user identities who are members of the particular user identity's social network from the electronic social networking platform: general targeted posts directed to the user identities within the previous 30 days; birthday-related targeted posts directed to the user identities within the previous 30 days; targeted posts directed to the user identities that originated from gaming applications that leverage the electronic social networking platform within the previous 30 days; and event invitations the user identities received within the previous 30 days.

After extracting the targeted posts directed to the user identities within the previous 30 days, the social intelligence application may analyze the targeted posts directed to the user identities to determine which, if any, are birthday-related. (Examples of techniques for classifying posts as being birthday-related are described below in connection with FIGS. 7A-7B and FIGS. 8-9.) The social intelligence application then may count the number of general targeted posts directed to the user identities within the previous 30 days; the number of birthday-related targeted posts directed to the user identities within the previous 30 days; the number of targeted posts directed to the user identities that originated from gaming applications that leverage the electronic social networking platform within the previous 30 days; the number of unique members of the user identities' social networks who directed targeted posts to the user identities within the previous 30 days; and the number of quality event invitations the user identities received within the previous 30 days.

The social intelligence application then may calculate numeric measures of popularity within the electronic social networking platform for the individual user identities as a function of one or more of these values. For example, in some implementations, the social intelligence application may calculate numeric measures of popularity within the electronic social networking platform for the individual user identities according to the following formula:

$$\text{Popularity} = (\text{\# general targeted posts}) + 0.1 \cdot (\text{\# game posts}) + (\text{\# unique friends posting}) + 2 \cdot (\text{\#quality event invitations}) + 0.1 \cdot (\text{\# birthday targeted posts})$$

After calculating numeric measures of popularity within the electronic social networking platform for individual user identities who are members of the particular user identity's social network, the social intelligence application then may use these numeric measures to rank the individual user identities who are members of the particular user identity's social network according to their popularity within the electronic social networking platform.

As illustrated in FIG. 5E, GUI 500 also provides selectable "Filter" control 522 and selectable "By Friendlist" control 524 for filtering the user identities for whom popularity statistics are presented in GUI 500 in the same manner as described above in connection with FIGS. 5A-5C. Furthermore, depending upon the screen real estate available, the user identities presented within the view provided by GUI 500 as illustrated in FIG. 5E may extend beyond the visible borders of the GUI 500. Consequently, GUI 500 may enable a user to scroll the view up or down in order to see additional user identities presented by the GUI 500 in the view illustrated in FIG. 5E.

Referring now to FIG. 5F, GUI 500 provides an aggregated view of user identities who are members of the particular user identity's social network within the electronic social networking platform that reflects relative levels of influence within the electronic social networking platform for user identities who are members of the particular user identity's social network. In particular, GUI 500 presents a list of user identities (column 562) who are members of the particular user identity's social network ranked (column 564) according to numeric measures of the user identities' influence within the electronic social networking platform over the previous 30 days. In addition, GUI 500 presents various different statistics about each of the listed user identities' engagement within the electronic social networking platform over the previous 30 days that the social intelligence application uses to calculate numeric measures of the user identities' influence within the electronic social networking platform.

More particularly, GUI 500 presents the number of status posts (column 566) the user identities generally broadcast to their social networks; the number of comments (column 568) the user identities received responsive to their status posts; the number of unique user identities who are members of the user identities' social networks who commented on their status posts (column 570); the number of endorsements (column 572) the user identities received responsive to their status posts; the number of unique user identities who are members of the user identities' social networks who endorsed their status posts (column 574); and the average number of responses (column 576) (e.g., comments and endorsements) the user identities received to their status posts.

As discussed above, the social intelligence application is configured to extract from the electronic social networking platform data about individual user identities of the electronic social networking platform and the members of their social networks within the electronic social networking platform. Thus, at some point prior to presenting the influence information for members of the particular user identity's social network that is displayed in GUI 500 of FIG. 5F to the particular user identity, the social intelligence application extracts the following data for individual user identities who are members of the particular user identity's social network from the electronic social networking platform: status posts the user identities generally broadcast to their social networks within the previous 30 days; comments the user identities received responsive to status posts they posted within the previous 30 days; and endorsements the user identities received responsive to the status posts they posted within the previous 30 days.

After extracting this data from the electronic social networking platform, the social intelligence application processes this data to, among other things, count the number of status posts the user identities generally broadcast to their social networks within the previous 30 days; the number of comments the user identities received responsive to status posts they posted within the previous 30 days; the number of unique user identities who are members of the user identities' social networks who commented on the status posts they posted within the previous 30 days; the number of endorsements the user identities received responsive to status posts they posted within the previous 30 days; and the number of unique user identities who are members of the user identities' social networks who endorsed status posts they posted within the previous 30 days. In addition, the social intelligence application processes the extracted data to calculate the average number of responses (e.g., comments and endorsements) the user identities received to status posts they posted within the previous 30 days.

The social intelligence application then may calculate numeric measures of influence within the electronic social networking platform for the individual user identities as a function of one or more of these values. For example, in some implementations, the social intelligence application may calculate numeric measures of influence within the electronic social networking platform for the individual user identities according to the following formula:

$$\text{Influence} = (\text{avg. responses per post}) \cdot (((\text{\# comments received}) + 2 \cdot (\text{\# unique friends commenting}) + 0.5 \cdot (\text{\# endorsements received}) + 2 \cdot (\text{\# unique friends endorsing})) \cdot 0.25)$$

After calculating numeric measures of influence within the electronic social networking platform for individual user identities who are members of the particular user identity's social network, the social intelligence application then may use these numeric measures to rank the individual user identities who are members of the particular user identity's social network according to their influence within the electronic social networking platform.

As illustrated in FIG. 5F, GUI 500 also provides selectable "Filter" control 522 and selectable "By Friendlist" control 524 for filtering the user identities for whom influence statistics are presented in GUI 500 in the same manner as described above in connection with FIGS. 5A-5C. Furthermore, depending upon the screen real estate available, the user identities presented within the view provided by GUI 500 as illustrated in FIG. 5F may extend beyond the visible borders of the GUI 500. Consequently, GUI 500 may enable a user to scroll the view up or down in order to see additional user identities presented by the GUI 500 in the view illustrated in FIG. 5F.

Referring now to FIG. 5G, GUI 500 provides an aggregated view of user identities who are members of the particular user identity's social network within the electronic social networking platform that reflects relative levels of happiness within the electronic social networking platform for user identities who are members of the particular user identity's social network. In particular, GUI 500 presents a list of user identities (column 578) who are members of the particular user identity's social network ranked (column 580) according to numeric measures of the user identities' happiness within the electronic social networking platform over the previous 30 days. In addition, GUI 500 presents various different statistics about each of the listed user identities' communications within the electronic social networking platform over the previous 30 days that the social intelligence application uses to calculate numeric measures of the user identities' happiness within the electronic social networking platform.

More particularly, GUI 500 presents the total number of status posts (column 582) the user identities generally broadcast to their social networks; the number of status posts the user identities broadcast to their social networks that are categorized as being happy (column 584); and the number of status posts the user identities broadcast to their social networks that are categorized as being unhappy (column 586).

As discussed above, the social intelligence application is configured to extract from the electronic social networking platform data about individual user identities of the electronic social networking platform and the members of their social networks within the electronic social networking platform. Thus, at some point prior to presenting the happiness information for members of the particular user identity's social network that is displayed in GUI 500 of FIG. 5G to the particular user identity, the social intelligence application extracts status posts the user identities generally broadcast to their social networks within the previous 30 days.

After extracting these status posts from the electronic social network, the social intelligence application may analyze the extracted status posts to determine which, if any, of the status posts are happy status posts and which, if any, of the status posts are unhappy status posts. (Examples of techniques for classifying status posts as being happy or unhappy are described in greater detail below in connection with FIGS. 7A-7B and FIGS. 8-9.) The social intelligence application then may count the total number of status posts the user identities generally broadcast to their social networks within the previous 30 days; the number of status posts the user identities broadcast to their social networks within the previous 30 days that are categorized as being happy; and the number of status posts the user identities broadcast to their social networks within the previous 30 days that are categorized as being unhappy.

The social intelligence application then may calculate numeric measures of happiness within the electronic social networking platform for the individual user identities as a function of one or more of these values. For example, in some implementations, the social intelligence application may calculate numeric measures of happiness within the electronic social networking platform for the individual user identities according to the following formula:

$$\text{Happiness} = 5 \cdot (\text{\# happy posts}) - 10 \cdot (\text{\# unhappy posts})$$

After calculating numeric measures of happiness within the electronic social networking platform for individual user identities who are members of the particular user identity's social network, the social intelligence application then may use these numeric measures to rank the individual user identities who are members of the particular user identity's social network according to their happiness within the electronic social networking platform.

As illustrated in FIG. 5G, GUI 500 also provides selectable "Filter" control 522 and selectable "By Friendlist" control 524 for filtering the user identities for whom happiness statistics are presented in GUI 500 in the same manner as described above in connection with FIGS. 5A-5C. Furthermore, depending upon the screen real estate available, the user identities presented within the view provided by GUI 500 as illustrated in FIG. 5G may extend beyond the visible borders of the GUI 500. Consequently, GUI 500 may enable a user to scroll the view up or down in order to see additional user identities presented by the GUI 500 in the view illustrated in FIG. 5G.

Referring now to FIG. 5H, GUI 500 provides an aggregated view of user identities who are members of the particular user identity's social network within the electronic social networking platform that reflects relative levels of responsiveness to the particular user identity within the electronic social networking platform for user identities who are members of the particular user identity's social network. In particular, GUI 500 presents a list of user identities (column 588) who are members of the particular user identity's social network ranked (column 590) according to numeric measures of the user identities' responsiveness to the particular user identity within the electronic social networking platform over the previous 30 days. In addition, GUI 500 presents various different statistics about each of the listed user identities' responsiveness to the particular user identity within the electronic social networking platform over the previous 30 days that the social intelligence application uses to calculate numeric measures of the user identities' responsiveness to the particular user identity within the electronic social networking platform.

More particularly, GUI 500 presents the number of targeted posts (column 592) the user identities directed to the particular user identity; the number of comments (column 594) the user identities made in response to status posts broadcast by the particular user identity; and the number of the particular user identity's status posts the user identities endorsed (column 596).

As discussed above, the social intelligence application is configured to extract from the electronic social networking platform data about individual user identities of the electronic social networking platform and the members of their social networks within the electronic social networking platform. Thus, at some point prior to presenting the responsiveness information for members of the particular user identity's social network that is displayed in GUI 500 of FIG. 5H to the particular user identity, the social intelligence application extracts the following data from the electronic social networking platform: targeted posts the user identities directed to the particular user identity within the previous 30 days; comments the user identities made in response to status posts broadcast by the particular user identity within the previous 30 days; and endorsements by the user identities of status posts posted by the user identity within the previous 30 days.

After extracting this data from the electronic social networking platform, the social intelligence application processes this data to, among other things, count the number of targeted posts the user identities directed to the particular user identity within the previous 30 days; the number of comments the user identities made in response to status posts broadcast by the particular user identity within the previous 30 days; and the number of endorsements by the user identities of status posts posted by the user identity within the previous 30 days.

The social intelligence application then may calculate numeric measures of responsiveness to the particular user identity within the electronic social networking platform for the individual user identities as a function of one or more of these values. For example, in some implementations, the social intelligence application may calculate numeric measures of responsiveness to the particular user identity within the electronic social networking platform for the individual user identities according to the following formula:

$$\text{Responsiveness} = 3 \cdot (\text{\# posts to particular user identity}) + 2 \cdot (\text{\# comments in response to particular user identity}) + (\text{\# endorsements of particular user identity's status posts})$$

After calculating numeric measures of responsiveness to the particular user identity within the electronic social networking platform for individual user identities who are members of the particular user identity's social network, the social intelligence application then may use these numeric measures to rank the individual user identities who are members of the particular user identity's social network according to their responsiveness to the particular user identity within the electronic social networking platform.

As illustrated in FIG. 5H, GUI 500 also provides selectable "Filter" control 522 and selectable "By Friendlist" control 524 for filtering the user identities for whom responsiveness statistics are presented in GUI 500 in the same manner as described above in connection with FIGS. 5A-5C. Furthermore, depending upon the screen real estate available, the user identities presented within the view provided by GUI 500 as illustrated in FIG. 5H may extend beyond the visible borders of the GUI 500. Consequently, GUI 500 may enable a user to scroll the view up or down in order to see additional user identities presented by the GUI 500 in the view illustrated in FIG. 5H.

Figure 5I:
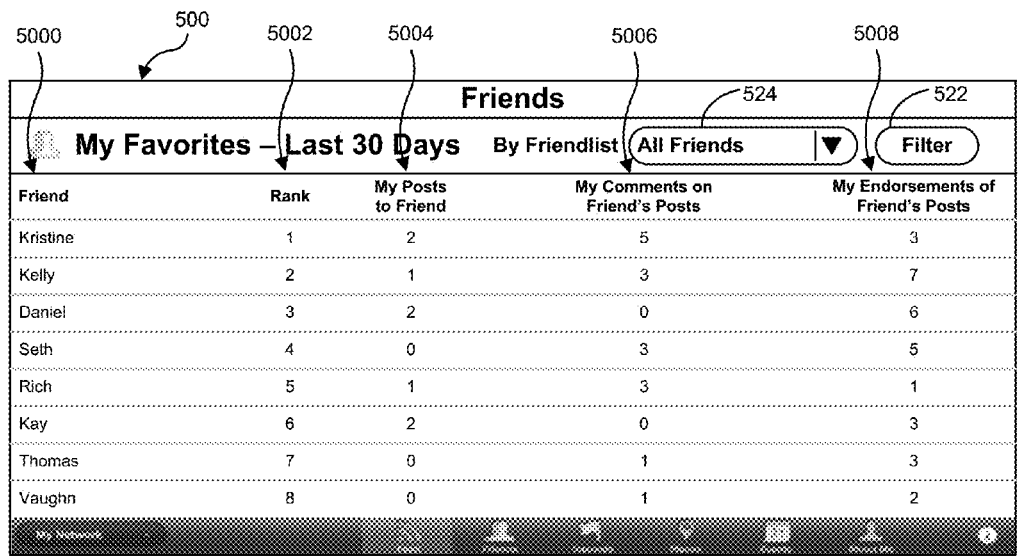

Referring now to FIG. 5I, GUI 500 provides an aggregated view of user identities who are members of the particular user identity's social network within the electronic social networking platform that reflects relative levels of outreach by the particular user identity within the electronic social networking platform to user identities who are members of the particular user identity's social network. In particular, GUI 500 presents a list of user identities (column 5000) who are members of the particular user identity's social network ranked (column 5002) according to numeric measures of the particular user identity's outreach to the user identities within the electronic social networking platform over the previous 30 days. In addition, GUI 500 presents various different statistics about the particular user identity's outreach to each of the listed user identities within the electronic social networking platform over the previous 30 days that the social intelligence application uses to calculate numeric measures of the particular user identity's outreach to the user identities who are members of the particular user identity's social network within the electronic social networking platform.

More particularly, GUI 500 presents the number of targeted posts (column 5004) the particular user identity directed to the user identities; the number of comments (column 5006) the particular user identity made in response to status posts broadcast by the user identities; and the number of the user identities' status posts the particular user identity endorsed (column 5008).

As discussed above, the social intelligence application is configured to extract from the electronic social networking platform data about individual user identities of the electronic social networking platform and the members of their social networks within the electronic social networking platform. Thus, at some point prior to presenting the outreach information for members of the particular user identity's social network that is displayed in GUI 500 of FIG. 5I to the particular user identity, the social intelligence application extracts the following data from the electronic social networking platform: targeted posts the particular user identity directed to the user identities within the previous 30 days; comments the particular user identity made in response to status posts broadcast by the user identities within the previous 30 days; and endorsements by the particular user identity of status posts posted by the user identities within the previous 30 days.

After extracting this data from the electronic social networking platform, the social intelligence application processes this data to, among other things, count the number of targeted posts the particular user identity directed to the user identities within the previous 30 days; the number of comments the particular user identity made in response to status posts broadcast by the user identities within the previous 30 days; and the number of endorsements by the particular user identity of status posts posted by the user identities within the previous 30 days.

The social intelligence application then may calculate numeric measures of outreach by the particular user identity within the electronic social networking platform to the individual user identities as a function of one or more of these values. For example, in some implementations, the social intelligence application may calculate numeric measures of outreach by the particular user identity within the electronic social networking platform to the individual user identities according to the following formula:

$$\text{Outreach} = 3 \cdot (\text{\# targeted posts by particular user identity}) + 2 \cdot (\text{\# responsive comments by particular user identity}) + (\text{\# particular identity endorsements})$$

After calculating numeric measures of outreach by the particular user identity within the electronic social networking platform to individual user identities who are members of the particular user identity's social network, the social intelligence application then may use these numeric measures to rank the individual user identities who are members of the particular user identity's social network according to the outreach by the particular user identity within the electronic social networking platform to the individual user identities.

As illustrated in FIG. 5I, GUI 500 also provides selectable "Filter" control 522 and selectable "By Friendlist" control 524 for filtering the user identities for whom outreach statistics are presented in GUI 500 in the same manner as described above in connection with FIGS. 5A-5C. Furthermore, depending upon the screen real estate available, the user identities presented within the view provided by GUI 500 as illustrated in FIG. 5I may extend beyond the visible borders of the GUI 500. Consequently, GUI 500 may enable a user to scroll the view up or down in order to see additional user identities presented by the GUI 500 in the view illustrated in FIG. 5I.

Figure 5J:
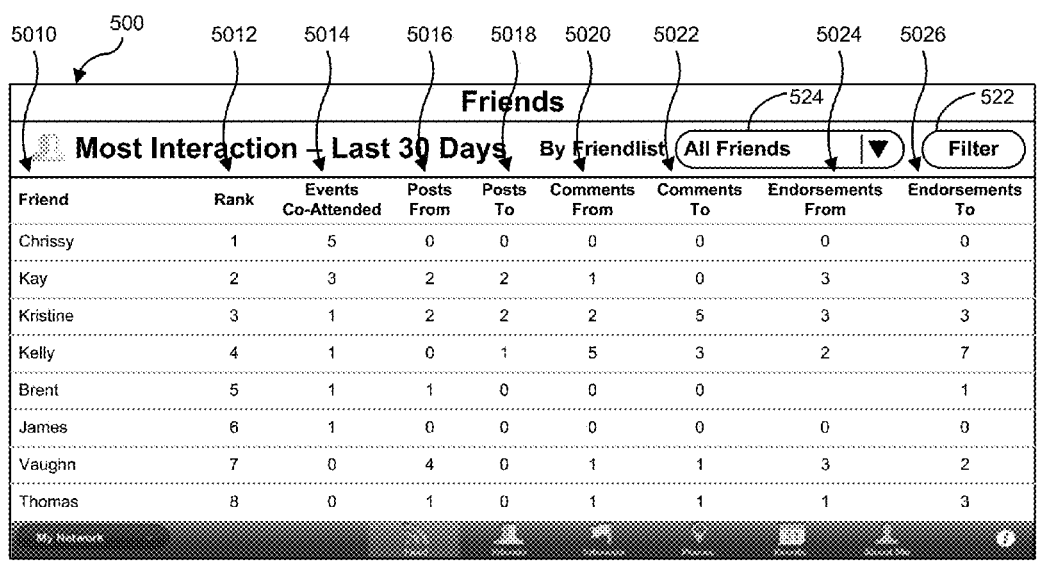

Referring now to FIG. 5J, GUI 500 provides an aggregated view of user identities who are members of the particular user identity's social network within the electronic social networking platform that reflects relative levels of interaction with the particular user identity within the electronic social networking platform by the user identities. In particular, GUI 500 presents a list of user identities (column 5010) who are members of the particular user identity's social network ranked (column 5012) according to numeric measures of the user identities' interaction with the particular user identity within the electronic social networking platform over the previous 30 days. In addition, GUI 500 presents various different statistics about the user identities' interaction with the particular user identity within the electronic social networking platform over the previous 30 days that the social intelligence application uses to calculate numeric measures of the user identities' interaction with the particular user identity within the electronic social networking platform.

More particularly, GUI 500 presents the number of events that the user identities attended with the particular user identity (column 5014); the number of targeted posts the user identities directed to the particular user identity (column 5016); the number of targeted posts the particular user identity directed to the user identities (column 5018); the number of comments the user identities made in response to status posts broadcast by the particular user identity (column 5020); the number of comments the particular user identity made in response to status posts broadcast by the user identities (column 5022); the number of the particular user identity's status posts the user identities endorsed (column 5024); and the number of the user identities' status posts the particular user identity endorsed (column 5026).

As discussed above, the social intelligence application is configured to extract from the electronic social networking platform data about individual user identities of the electronic social networking platform and the members of their social networks within the electronic social networking platform. Thus, at some point prior to presenting the interaction information for members of the particular user identity's social network that is displayed in GUI 500 of FIG. 5J to the particular user identity, the social intelligence application extracts the following data from the electronic social networking platform: information about events that occurred within the previous 30 days to which the particular user identity received and accepted invitations; information about events that occurred within the previous 30 days to which the user identities received and accepted invitations; targeted posts the user identities directed to the particular user identity within the previous 30 days; targeted posts the particular user identity directed to the user identities within the previous 30 days; comments the user identities made in response to status posts broadcast by the particular user identity within the previous 30 days; comments the particular user identity made in response to status posts broadcast by the user identities within the previous 30 days; endorsements of the particular user identity's status posts by the user identities within the previous 30 days; and endorsements of the user identities' status posts by the particular user identity within the previous 30 days.

After extracting this data from the electronic social networking platform, the social intelligence application processes this data to, among other things, count the number of events that occurred within the previous 30 days to which the particular user identity received and accepted invitations and to which the user identities also received and accepted invitations; the number of targeted posts the user identities directed to the particular user identity within the previous 30 days; the number of targeted posts the particular user identity directed to the user identities within the previous 30 days; the number of comments the user identities made in response to status posts broadcast by the particular user identity within the previous 30 days; the number of comments the particular user identity made in response to status posts broadcast by the user identities within the previous 30 days; the number of endorsements of the particular user identity's status posts by the user identities within the previous 30 days; and the number of endorsements of the user identities' status posts by the particular user identity within the previous 30 days.

The social intelligence application then may calculate numeric measures of interaction by the user identities within the electronic social networking platform with the particular user identity as a function of one or more of these values. For example, in some implementations, the social intelligence application may calculate numeric measures of interaction by the user identities within the electronic social networking platform with the particular user identity according to the following formula:

$$\text{Interaction}_i = \frac{(\text{Responsiveness}_i - \text{Outreach}_i) - |\text{Responsiveness}_i - \text{Outreach}_i|}{2} + \frac{|\text{Responsiveness}_i - \text{Outreach}_i|}{4} + 10 \cdot (\text{\# events coattended})$$

where, $\text{Interaction}_i$ represents the interaction score for an individual user identity, i; $\text{Responsiveness}_i$ represents the responsiveness score for an individual user identity, i (for example, calculated according to the formula for calculating responsiveness provided above); and $\text{Outreach}_i$ represents the outreach score for an individual user identity, i (for example, calculated according to the formula for calculating outreach provided above).

After calculating numeric measures of interaction by the user identities within the electronic social networking platform with the particular user identity, the social intelligence application then may use these numeric measures to rank the individual user identities who are members of the particular user identity's social network according to their interaction with the particular user identity within the electronic social networking platform.

As illustrated in FIG. 5J, GUI 500 also provides selectable "Filter" control 522 and selectable "By Friendlist" control 524 for filtering the user identities for whom outreach statistics are presented in GUI 500 in the same manner as described above in connection with FIGS. 5A-5C. Furthermore, depending upon the screen real estate available, the user identities presented within the view provided by GUI 500 as illustrated in FIG. 5J may extend beyond the visible borders of the GUI 500. Consequently, GUI 500 may enable a user to scroll the view up or down in order to see additional user identities presented by the GUI 500 in the view illustrated in FIG. 5J.

Referring now to FIG. 5K, GUI 500 provides an aggregated view of user identities who are members of the particular user identity's social network within the electronic social networking platform and presents the most recent status posts that the user identities generally broadcast to members of their social networks within the electronic social networking platform. In particular, GUI 500 presents a list of user identities (column 5028) who are members of the particular user identity's social network along with indications of their current city of residence (column 5030), their ages (5032), their relationship statuses (column 5034) (e.g., single, in a relationship, engaged, married, divorced, widowed), the most recent status updates they generally broadcast to their social networks (column 5036), and the dates of the most recent status updates they generally broadcast to their social networks (column 5038).

As discussed above, the social intelligence application is configured to extract from the electronic social networking platform data about individual user identities of the electronic social networking platform and the members of their social networks within the electronic social networking platform. Thus, at some point prior to presenting the information for members of the particular user identity's social network that is displayed in GUI 500 of FIG. 5K to the particular user identity, the social intelligence application extracts the following data from the electronic social networking platform: the user identities' current cities of residence, the user identities' ages (or dates of birth), the user identities' relationship statuses, and status posts generally broadcast by the user identities to their social networks.

After extracting this data from the electronic social networking platform, the social intelligence application processes the extracted status posts that the user identities generally broadcast to their social networks to identify which of the status posts the user identities broadcast to their social networks most recently. The social intelligence application then presents the most recent status post generally broadcast by each user identity along with the other extracted information for the user identity in the GUI 500 of FIG. 5K.

As illustrated in FIG. 5J, GUI 500 also provides selectable "Filter" control 522 and selectable "By Friendlist" control 524 for filtering the user identities for whom status posts are presented in GUI 500 in the same manner as described above in connection with FIGS. 5A-5C. In some implementations, GUI 500 may list the user identities presented within the view illustrated in FIG. 5K in alphabetical order. Furthermore, depending upon the screen real estate available, the user identities presented within the view provided by GUI 500 as illustrated in FIG. 5K may extend beyond the visible borders of the GUI 500. Consequently, GUI 500 may enable a user to scroll the view up or down in order to see additional user identities presented by the GUI 500 in the view illustrated in FIG. 5K.

FIG. 6A is a flow chart 600 that illustrates an example of a process for calculating numeric measures of engagement with an electronic social networking platform by user identities who are members of a particular user identity's social network within the electronic social networking platform. The process illustrated in the flow chart 600 of FIG. 6A may be performed by a computing system, such as, for example, computing system 408 of FIG. 4.

The computing system extracts data from the electronic social networking platform that reveals user identities who are members of the particular user identity's social network within the electronic social networking platform (602).

Then, based on knowing the user identities who are members of the particular user identity's social network within the electronic social networking platform, the computing system extracts data from the electronic social networking platform that reveals engagement with the electronic social networking platform by the user identities who are members of the particular user identity's social network within the electronic social networking platform (604). For instance, the computing system may extract from the electronic social networking platform data that reveals the user identities' activity levels within the electronic social networking platform (e.g., as described above in connection with FIG. 5A); data that reveals the user identities' communication levels within the electronic social networking platform (e.g., as described above in connection with FIG. 5D); data that reveals the user identities' popularity within the electronic social networking platform (e.g., as described above in connection with FIG. 5E); data that reveals the user identities' influence within the electronic social networking platform (e.g., as described above in connection with FIG. 5F); data that reveals the user identities' happiness within the electronic social networking platform (e.g., as described above in connection with FIG. 5G); data that reveals the user identities' responsiveness to the particular user identity (e.g., as described above in connection with FIG. 5H); data that reveals the outreach by the particular user identity to the user identities' within the electronic social networking platform (e.g., as described above in connection with FIG. 5I); and/or data that reveals the user identities' interaction with the particular user identity within the electronic social networking platform (e.g., as described above in connection with FIG. 5J). In some implementations, the computing system may extract data that reveals engagement with the electronic social networking platform by the user identities who are members of the particular user identity's social network within the electronic social networking platform during a limited window of time (e.g., the previous week, the previous month (or 30 days), the previous 3 months (or 90 days), the previous 6 months (or 180 days), the previous year, etc.).

The computing system also optionally may extract data from the electronic social networking platform about demographic characteristics of the user identities who are members of the particular user identity's social network within the electronic social networking platform (606). Additionally or alternatively, the computing system also optionally may extract data from the electronic social networking platform that reveals the membership of one or more different predefined subsets of user identities who are members of the particular user identity's social network (608).

Based on the extracted data that reveals engagement with the electronic social networking platform by the user identities who are members of the particular user identity's social network within the electronic social networking platform, the computing system then calculates numeric measures of engagement with the electronic social networking platform by the user identities of the particular user identity's social network within the electronic social networking platform (610). For instance, the computing system may calculate numeric measures of the user identities' activity levels within the electronic social networking platform (e.g., as described above in connection with FIG. 5A); numeric measures of the user identities' communication levels within the electronic social networking platform (e.g., as described above in connection with FIG. 5D); numeric measures of the user identities' popularity within the electronic social networking platform (e.g., as described above in connection with FIG. 5E and/or as described below in connection with FIG. 6B); numeric measures of the user identities' influence within the electronic social networking platform (e.g., as described above in connection with FIG. 5F and/or as described below in connection with FIG. 6C); numeric measures of the user identities' happiness within the electronic social networking platform (e.g., as described above in connection with FIG. 5G); numeric measures of the user identities' responsiveness to the particular user identity (e.g., as described above in connection with FIG. 5H); numeric measures of the outreach by the particular user identity to the user identities within the electronic social networking platform (e.g., as described above in connection with FIG. 5I); and/or numeric measures of the user identities' interaction with the particular user identity within the electronic social networking platform (e.g., as described above in connection with FIG. 5J). In some implementations, the computing system may use the extracted data that reveals engagement with the electronic social networking platform by the user identities who are members of the particular user identity's social network within the electronic social networking platform to calculate numeric measures of engagement with the electronic social networking platform by the user identities during a limited window of time (e.g., the previous week, the previous month (or 30 days), the previous 3 months (or 90 days), the previous 6 months (or 180 days), the previous year, etc.).

After calculating the numeric measures of engagement with the electronic social networking platform by the user identities of the particular user identity's social network within the electronic social networking platform, the computing system then makes available for display an aggregated view of user identities who are members of the particular user identity's social network within the electronic social networking platform that reflects the calculated numeric measures of engagement with the platform by the user identities who are members of the particular user identity's social network relative to one another. For instance, the computing system may make available for display an aggregated view of user identities who are members of the particular user identity's social network within the electronic social networking platform that reflects the user identities' activity levels within the electronic social networking platform (e.g., as described above in connection with FIG. 5A); the user identities' communication levels within the electronic social networking platform (e.g., as described above in connection with FIG. 5D); the user identities' popularity within the electronic social networking platform (e.g., as described above in connection with FIG. 5E); the user identities' influence within the electronic social networking platform (e.g., as described above in connection with FIG. 5F); the user identities' happiness within the electronic social networking platform (e.g., as described above in connection with FIG. 5G); the user identities' responsiveness to the particular user identity (e.g., as described above in connection with FIG. 5H); the outreach by the particular user identity to the user identities' within the electronic social networking platform (e.g., as described above in connection with FIG. 5I); and/or the user identities' interaction with the particular user identity within the electronic social networking platform (e.g., as described above in connection with FIG. 5J).

In some implementations, the computing system optionally may enable filtering of the aggregated view of the user identities who are members of the particular user identity's social network according to demographic characteristics of the user identities (614). Additionally or alternatively, the computing system also optionally may enable filtering of the aggregated view of the user identities who are members of the particular user identity's social network to include only user identities who belong to one or more predefined subsets of user identities who are members of the particular user identity's social network within the electronic social networking platform (616).

Figure 6B:
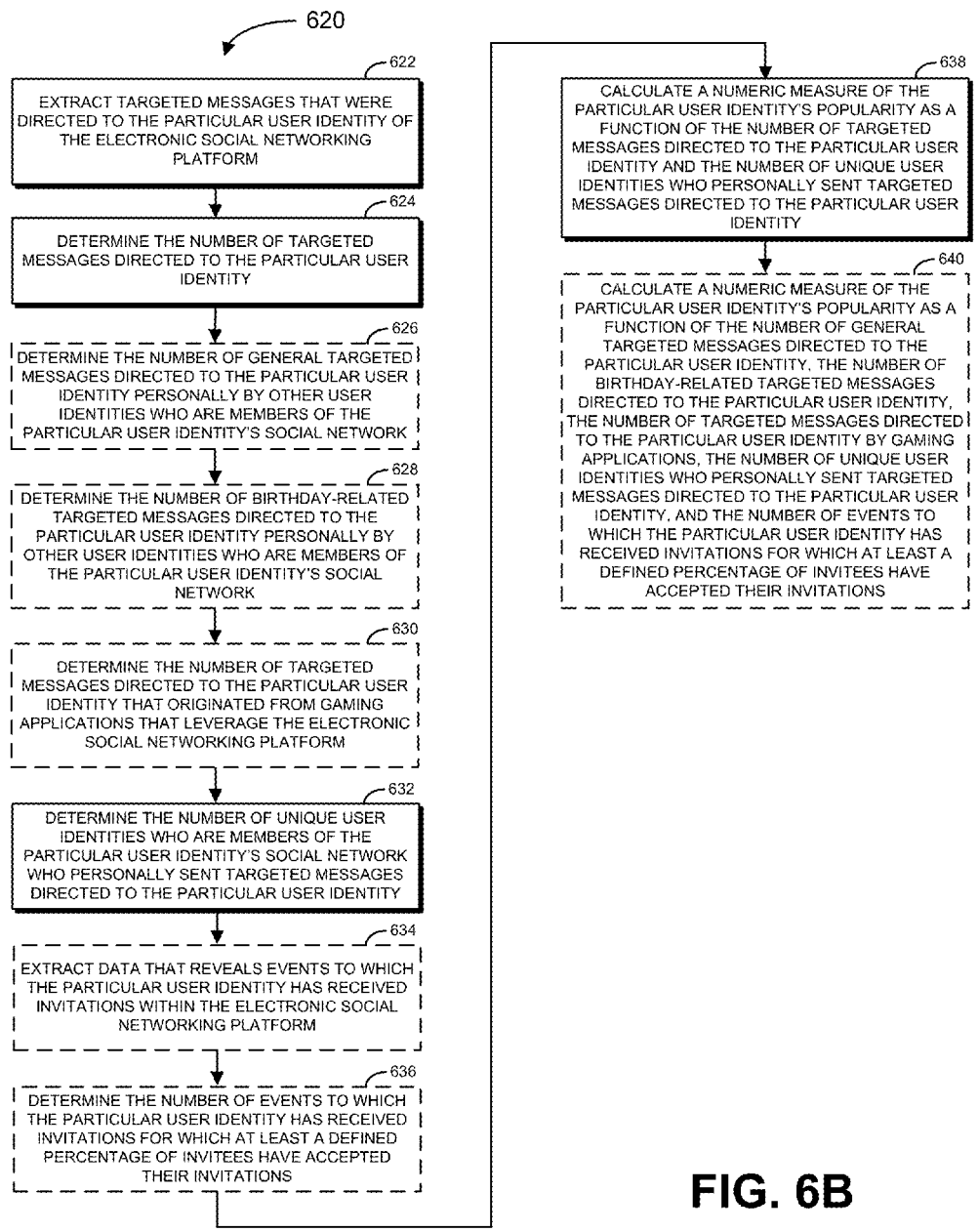

FIG. 6B is a flow chart 620 that illustrates an example of a process for calculating a numeric measure of a particular user identity's popularity within an electronic social networking platform. The process illustrated in the flow chart 620 of FIG. 6B may be performed by a computing system, such as, for example, computing system 408 of FIG. 4.

The computing system extracts targeted messages that were directed to the particular user identity of the electronic social networking platform from the electronic social networking platform (622). In some implementations, the computing system may extract targeted messages that were directed to the particular user identity during a defined window of time (e.g., the previous week, the previous month (or 30 days), the previous 3 months (or 90 days), the previous 6 months (or 180 days), the previous year, etc.).

The computing system then determines the number of targeted messages directed to the particular user identity that were extracted (624). In some implementations, the computing system may determine the number of targeted messages that were directed to the particular user identity within a defined window of time (e.g., the previous week, the previous month (or 30 days), the previous 3 months (or 90 days), the previous 6 months (or 180 days), the previous year, etc.). In some implementations, as part of determining the number of targeted messages directed to the particular user identity, the computing system optionally also may determine the number of general targeted messages that were directed to the particular user identity personally by other user identities who are members of the particular user identity's social network (626) (e.g., the number of non-birthday-related targeted messages that were directed to the particular user identity personally by other user identities who are members of the particular user identity's social network). Additionally or alternatively, the computing system optionally also may determine the number of birthday-related targeted messages that were directed to the particular user identity personally by other user identities who are members of the particular user identity's social network (628). (Examples of techniques for classifying posts as being birthday-related are described below in connection with FIGS. 7A-7B and FIGS. 8-9.) Similarly, the computing system optionally also may determine the number of targeted messages directed to the particular user identity that originated from gaming applications that leverage the electronic social networking platform (630).

In addition to determining the number of targeted messages that were directed to the particular user identity, the computing system also determines the number of unique user identities who are members of the particular user identity's social network who personally sent targeted messages directed to the particular user identity (632). In some implementations, the computing system may determine the number of unique user identities who are members of the particular user identity's social network who personally sent targeted messages directed to the particular user identity within a defined window of time (e.g., the previous week, the previous month (or 30 days), the previous 3 months (or 90 days), the previous 6 months (or 180 days), the previous year, etc.).

In some implementations, the computing system also optionally may extract data that reveals events to which the particular user identity has received invitations within the electronic social networking platform (634). In such implementations, the computing system may use this extracted information to determine the number of events to which the particular user identity has received invitations for which at least a defined percentage of the invitees have accepted their invitations (636). In some cases, the computing system may determine the number of events to which the particular user identity has received invitations within a defined window of time (e.g., the previous week, the previous month (or 30 days), the previous 3 months (or 90 days), the previous 6 months (or 180 days), the previous year, etc.) for which at least a defined percentage of the invitees have accepted their invitations.

The computing system also calculates a numeric measure of the particular user identity's popularity as a function of the number of targeted messages directed to the particular user identity (e.g., during a defined window of time) and the number of unique user identities who personally sent targeted messages directed to the particular user identity (e.g., during the defined window of time) (638).

In some particular implementations, the computing system may calculate a numeric measure of the particular user identity's popularity as a function of the number of general targeted messages directed to the particular user identity (e.g., during the defined window of time), the number of birthday-related targeted messages directed to the particular user identity (e.g., during the defined window of time), the number of targeted messages directed to the particular user identity that originated from gaming applications (e.g., during the defined window of time), the number of unique user identities who personally sent targeted messages directed to the particular user identity (e.g., during the defined window of time), and the number of events to which the particular user identity received invitations (e.g., during the defined window of time) for which at least a defined percentage of invitees have accepted their invitations (640). For example, the computing system may calculate a numeric measure of the particular user identity's popularity according to the formula for calculating popularity set forth above in connection with the discussion of FIG. 5E.

Figure 6C:
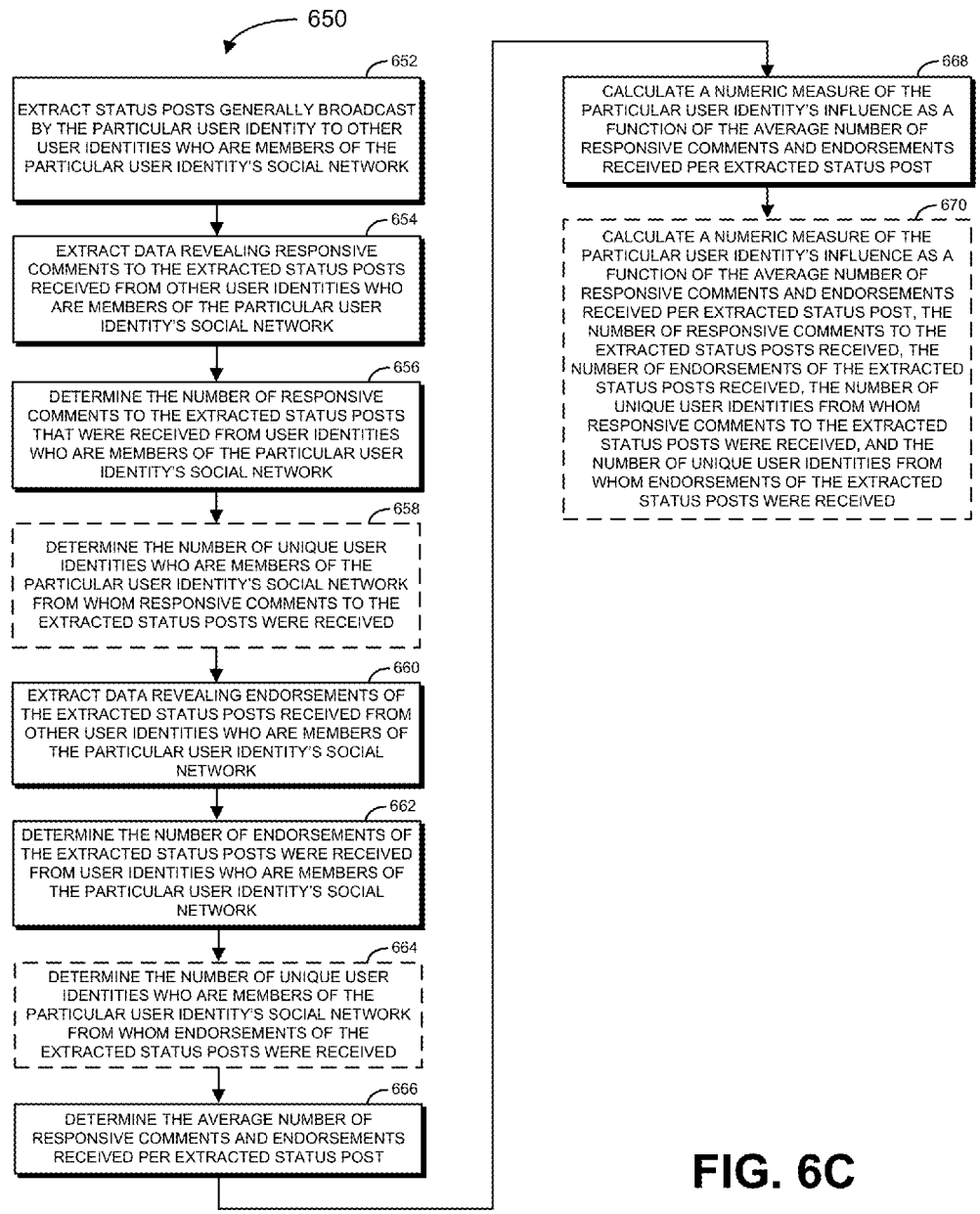

FIG. 6C is a flow chart 650 that illustrates an example of a process for calculating a numeric measure of a particular user identity's influence within an electronic social networking platform. The process illustrated in the flow chart 650 of FIG. 6C may be performed by a computing system, such as, for example, computing system 408 of FIG. 4.

The computing system extracts posts generally broadcast by the particular user identity to other user identities who are members of the particular user identity's social network (652). In some implementations, the computing system may extract posts generally broadcast by the particular user identity to other user identities during a defined window of time (e.g., the previous week, the previous month (or 30 days), the previous 3 months (or 90 days), the previous 6 months (or 180 days), the previous year, etc.).

In addition, the computing system extracts data revealing responsive comments to the extracted status posts that were received from other user identities who are members of the particular user identity's social network within the electronic social networking platform (654). The computing system then may use this extracted data to determine the number of responsive comments to the extracted status posts that were received from members of the particular user identity's social network (656). In some implementations, the computing system also optionally may determine the number of unique user identities who are members of the particular user identity's social network from whom responsive comments to the extracted status posts were received (658).

The computing system also extracts data revealing endorsements of the extracted status posts that were received from user identities who are members of the particular user identity's social network within the electronic social networking platform (660). The computing system then may use this extracted data to determine the number endorsements of the extracted status posts that were received from user identities who are members of the particular user identity's social network within the electronic social networking platform (662). In some implementations, the computing system also optionally may determine the number of unique user identities who are members of the particular user identity's social network from whom endorsements of the extracted status posts were received (664).

The computing system then determines the average number of responsive comments and endorsements that were received for the extracted status posts (666). Thereafter, the computing system calculates a numeric measure of the particular user identity's influence within the electronic social networking platform as a function of the average number of responsive comments and endorsements received for the extracted status posts (668). In some particular implementations, the computing system may calculate a numeric measure of the particular user identity's influence as a function of the average number of comments and endorsements received per extracted status post, the number of responsive comments to the extracted status posts, the number of endorsements of the extracted status posts, the number of unique user identities from whom responsive comments to the extracted status posts were received, and the number of unique user identities from whom endorsements of the extracted status posts were received. For example, the computing system may calculate a numeric measure of the particular user identity's influence according to the formula for calculating influence set forth above in connection with the discussion of FIG. 5F.

As discussed above, in some implementations, calculating a numeric measure of a user identity's engagement with an electronic social networking platform may involve determining whether communications exchanged by or with the user identity within the electronic social networking platform are birthday-related and/or whether such communications are happy communications or unhappy communications. As such, examples of techniques for categorizing communications (e.g., as birthday-related, happy, and/or unhappy communications) are described below in connection with FIGS. 7A-7B and FIGS. 8-9.

FIG. 7 is a flow chart 700 that illustrates an example of a process for categorizing a text string (e.g., an electronic message shared with a user identity within an electronic social networking platform or a sentence or phrase within an electronic message shared with a user identity within an electronic social networking platform). The processes illustrated in the flow chart 700 of FIG. 7 may be performed by a computing system, such as, for example, computing system 408 of FIG. 4.

The computing system accesses a text string (702). For example, the computing system access a message shared with a user identity within an electronic social networking platform. The computing system also accesses an index (e.g., a radix tree) of one or more indicators that are indicative of a category (704). For example, the category may be one of a happy mood, an unhappy mood, and birthday-related.

After accessing the text string, the computing system also identifies one or more words within the accessed text string (706). For example, the computing system may identify words within the accessed text string by identifying breaks between characters in the accessed text string. After identifying the words within the accessed text string, the computing system searches for one or more of the indicators that that are indicative of the category within the identified words of the text string (708). If the computing system determines that an indicator indicative of the category is present in the text string based on having searched for the indicators within the identified words of the text string (710), the computing system categorizes the text string as belonging to the category and stores an indication that the text string has been categorized as belonging to the category in computer-readable storage media (712).

Figure 7B:
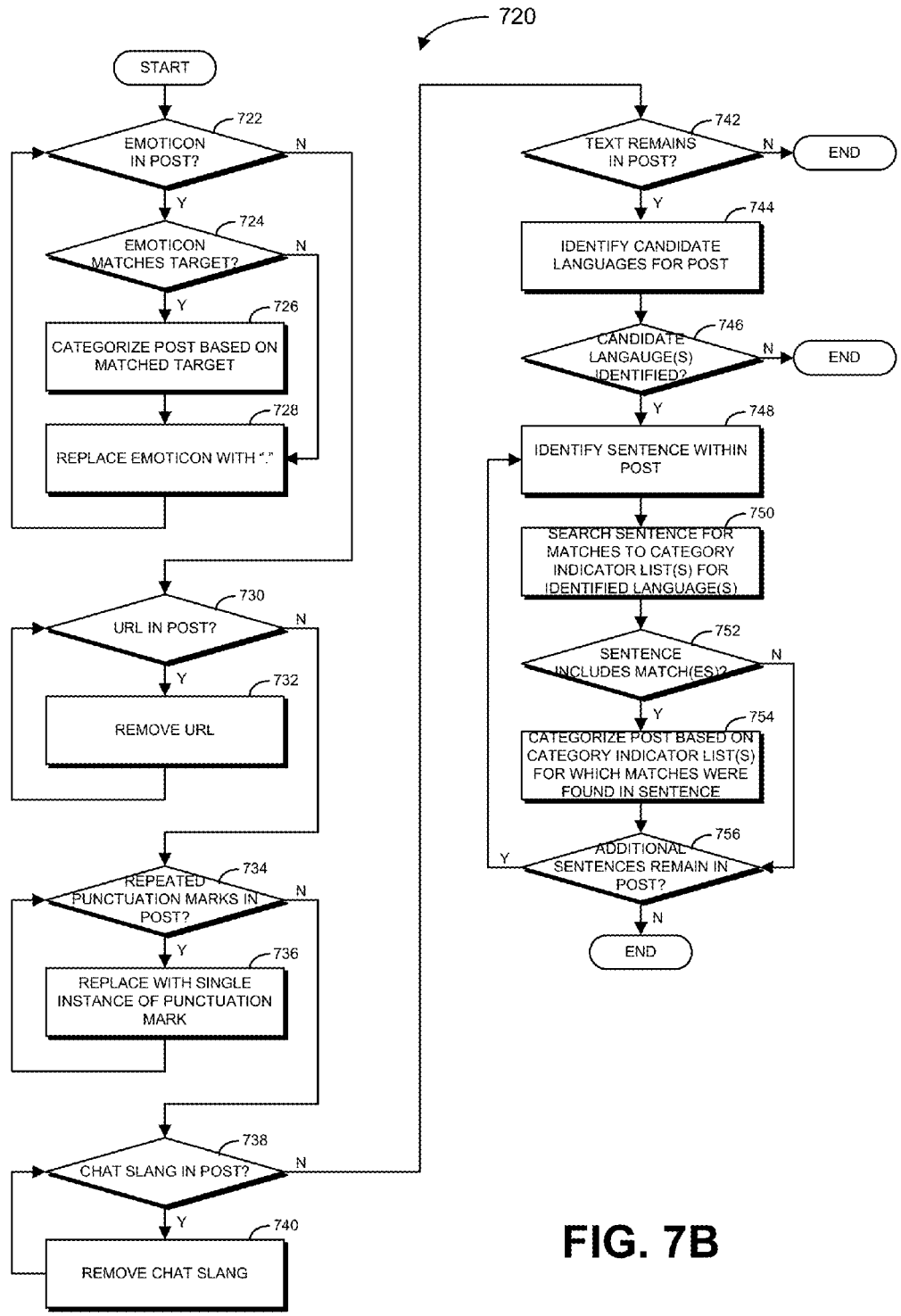

FIG. 7B is a flow chart 720 that illustrates an example of a process for categorizing a message (e.g., a post made by a user identity within an electronic social networking platform). The processes illustrated in the flow chart 720 of FIG. 7B may be performed by a computing system, such as, for example, computing system 408 of FIG. 4.

The computing system determines if the message includes any emoticons (722). If the computing system determines that the message includes an emoticon, the computing system proceeds to determine if the emoticon identified in the message matches any target emoticons identified as being indicative of certain categories (724). For example, in some implementations, a first set of target emoticons may be identified as being indicative of happy messages and a second set of target emoticons may be identified as being indicative of unhappy messages. (An example of a set of emoticons that may be indicative of happy messages is presented in Table 1, and an example of a set of emoticons that may be indicative of unhappy messages in presented in Table 2.) In such implementations, the computing system may compare the emoticon identified within the message to the first and second sets of emoticons to determine if the emoticon identified within the message matches any of the emoticons in the first and second sets of emoticons.

TABLE 1

| >:] | [:< | :-) | (-: | :) | :) | (: | : ) | (: |
|---|---|---|---|---|---|---|---|---|
| :o) | (o: | :] | [: | :3 | :c) | :> | <: | =] |
| 8) | (8 | =) | (= | :} | {: | :) | (: | >:D |
| :-D | :D | 8-D | 8D | x-D | xD | X-D | XD | =-D |
| =D | =-3 | =3 | (y) | \o/ | *\o/* | o/*\o | o/\o | ^5 |
| >_> | ^<_<^ | <3 | :-* | *-: | :* | *: | >B] | B) |
| B-) | 8) | (8 | 8-) | (-8 | >:D | :-D | :D | =-D |
| =D | =-3 | =3 | >;] | [;< | ;-) | (-; | ;) | (; |
| ; ) | (; | *-) | (-* | *) | (* | ;-] | [-; | ;] |
| [; | ;D | >B] | B) | B-) | 8-) | (-8 | <3 | (^_^) |
| (-_-) | (^_^) | (._.) | ^_^ | '_' | (~_) | (_~) | ~.^_^.~ | (^o^) |
| (^3^) | d(>w<)b | \m/*.*\m/ | 0-0 | | | | | |

TABLE 2

| :( | ): | :-( | )-: | : ( | ) : | =( | )= | >:[ |
|---|---|---|---|---|---|---|---|---|
| ]:< | :-c | :c | :-< | >-: | :< | >: | :-[ | ]-: |
| :[ | ]: | :{ | }: | >.> | <.< | >.< | -.- | D:< |
| D: | D8 | D; | D= | DX | v.v | D-': | (n) | D:< |
| >:( | >:-C | >:C | >:O | D-:< | >:-( | :-@ | ;( | `_<< |
| D< | </3 | \,,/ | \m/ | >:) | (:< | >;) | (;< | >:-) |
| (-:< | :\| | \|: | >:\ | >:/ | :-/ | :-. | :/ | :\ |
| =/ | =\ | :S | :'( | )': | ;*( | )*; | T.T | T_T |
| Y.Y | Y_Y | >:X | :-X | :X | :-# | :# | :$ | (>_<) |
| (>.<) | (>_>) | (<_<) | (Â_Â) | (-_-) | q(;_;)p | (;_;) | (T_T) | (T~T) |
| (ToT) | (T^T) | (._.) | (,_,) | 0.o | o.0 | O_o | o_O | @_@ |
| O_O | (*_*) | ^///^ | >///< | >///> | o///o | -///- | =///= | x_O |
| O_x | | | | | | | | |

If the computing system determines that the emoticon identified in the message matches a target emoticon identified as being indicative of a certain category, the computing system categorizes the message as belonging to the category of the target emoticon that the emoticon identified within the message matched (726). For example, if the computing system determines that the emoticon identified within the message matches one of the emoticons presented in Table 1, the computing system may categorize the message as a happy message. Similarly, if the computing system determines that the emoticon identified within the message matches one of the emoticons presented in Table 2, the computing system may categorize the message as an unhappy message. In addition to determining if the emoticon identified within the message matches any target emoticons, the computing system also may replace the emoticon identified within the message with a period (i.e., ".") (728). The computing system may repeat operations 724, 726, and 728 for all emoticons identified in the message.

In addition to identifying emoticons in the message, the computing system also may determine if the message includes any uniform resource locators (URLs) (730). For example, the computing system may search the message for character strings beginning with the prefixes "http://" or "https://" and identify as a URL any character string that begins with one of these prefixes. The computing system also may search the message for other character strings or patterns that frequently appear in URLs to identify URLs within the message, for example, in the event that ULRs that do not include the "http://" or "https://" are present within the message. If the computing system determines that the message includes a URL, the computing system removes the URL from the message (732). This operation may be repeated for all URLs identified in the message.

In addition to identifying URLs in the message, the computing system also determines if the message includes instances of repeated punctuation marks (734). If the computing system determines that the message includes an instance of a repeated punctuation mark, the computing system replaces the repeated punctuation mark with a single instance of the punctuation mark (736). For example, if the computing system recognizes a repeated string of periods (e.g., "....."), the computing system may replace the repeated string of periods with a single period (e.g., "."). Similarly, if the computing system recognizes a repeated string of question marks (e.g., "?????") or a repeated string of exclamation marks (e.g., "!!!!!"), the computing system may replace the repeated string of question marks with a single question mark (e.g., "?") or the repeated string of exclamation marks with a single exclamation mark (e.g., "!"). This operation may be repeated for all instances of repeated punctuation marks in the message The computing system also determines if the message includes any instances of so-called chat slang (e.g., "hehehe," or "hahaha"). If the computing system determines that the message includes an instance of chat slang, the computing system removes the chat slang from the message (740). This operation may be repeated for all instances of chat slang identified in the message.

After removing any emoticons, URLs, repeated punctuation marks, and/or chat slang from the message, the computing system then determines if any text remains in the message (742). If no text remains in the message at this point, the process ends. Alternatively, if text remains in the message, the computing system attempts to identify one or more candidate languages for the message (744). (An example of a process for identifying candidate languages for a message is illustrated and described in greater detail below in connection with FIG. 8.) If the computing system is unable to identify a candidate language for the message, the process ends. Alternatively, if the computing system is able to identify one or more candidate languages for the message, the computing system proceeds.

As described in greater detail below, in some implementations, the computing system attempts to categorize the message based on the appearance of certain category indicators (e.g., words, terms, phrases, strings, patterns etc.) in the message. In some implementations, the computing system may maintain different sets of category indicators for each of several different languages. Thus, the computing system may attempt to identify at least two different candidate languages for the message, and then the computing system may attempt to categorize the message using the sets of category indicators for each of the different candidate languages.

After identifying one or more candidate languages for the message, the computing system identifies individual sentences within the post (748). For example, the computing system may identify individual sentences within the message by identifying text strings that conclude with certain sentence-ending punctuation marks (e.g., periods ("."), question marks ("?"), or exclamation marks ("!")).

For each sentence identified within the message, the computing system then searches the sentence for category indicators that match category indicator lists for each of the candidate languages identified for the message (750). (An example of a process for searching text for category indicators that match category indicator lists is illustrated and described in greater detail below in connection with FIG. 9.) Category indicator lists may be available for a number of different categories in a number of different languages. For example, category indicator lists may be available for categorizing messages as happy or unhappy or as being birthday-related. Example category indicator lists for each of these categories for the English language are provided in Tables 3-5 below.

TABLE 3

Happy Message Indicators thrilled
so happy
also happy
so excited
also excited
can't wait
cannot wait
cant wait
great* news
best news
best%day**
great*%day**
great* time*
best time*
so blessed
looking forward
hooray
so much fun
had a blast
in love*
yay**
woo+hoo
woo* hoo**
wonderful
great*%week*
best%week*
terrific
fantastic*
awesome*
amazing*

TABLE 4

Unhappy Message Indicators so sick
still sick
so upset
so angry
so stressed
so mad
bad news
awful news
terrible news
bad day**
awful day**
terrible day**
bad mood
disgusted
frustrated
bored*
pissed off
bullshit
bull shit
sucks
fucked
irritated
annoyed
sick and tired
idiot*
moron
morons
moronic

TABLE 5

Birthday Message Indicators birthday
bday
b-day
born day

Within the example category indicator lists presented in Tables 3-5 above, the notations presented below in Table 6 may be used to indicate different rules:

TABLE 6

| Notation | Rule |
|---|---|
| "*" | The character string immediately preceding the "*" is a prefix of a word in the text. |
| "" | The character string immediately preceding the "" is a substring of a word in the text. |
| "%" | The two character strings separated by the "%" appear in the text in the indicated order. |
| "+" | The two character strings separated by the "+" appear in single word in the text. |
| "A!B" | The character string (or phrase) that precedes the "!" appears in the text and the character string (or phrase) that follows the "!" does not appear in the text. |
| "!A" | A leading "!" in a category indicator is a negation operator that indicates that text should not be categorized as belonging to the category if the character string or phrase following the "!" appears in the text. |
| "#13" | The text includes an emoticon identified as being indicative of an unhappy mood (e.g., the emoticons included in Table 2). |

Still referring to FIG. 7B, if the computing system detects that the sentence includes matches to one or more of the category indicator lists for the candidate language (752), the computing system categorizes the message from which the sentence was taken as belonging to the category of the indicator list(s) for which matches were found in the sentence (754). The computing system may repeat these operations for each sentence identified within the message. After each sentence within the message has been searched for category indicators that match category indicator lists for each of the candidate languages identified for the message, the process may end.

In some implementations, instead of searching individual sentences of a post for matches to category indicator lists, an entire post itself may be searched for matches to category indicator lists irrespective of the number of sentences within the post.

In some implementations, the computing system also may search the message for the word "not." In such implementations, if the computing system has categorized a message as being a happy message or a sad message and the computing system determines that the word "not" is present in the message, the computing system may reverse the happy or sad categorization. For example, if the computing system has categorized a message as being a happy message and the computing system detects the word "not" as being present in the message, the computing system may remove the happy categorization for the message. Similarly, if the computing system has categorized the message as being unhappy and the computing system detects the word "not" as being present in the message, the computing system may remove the unhappy categorization for the message.

Figure 8:
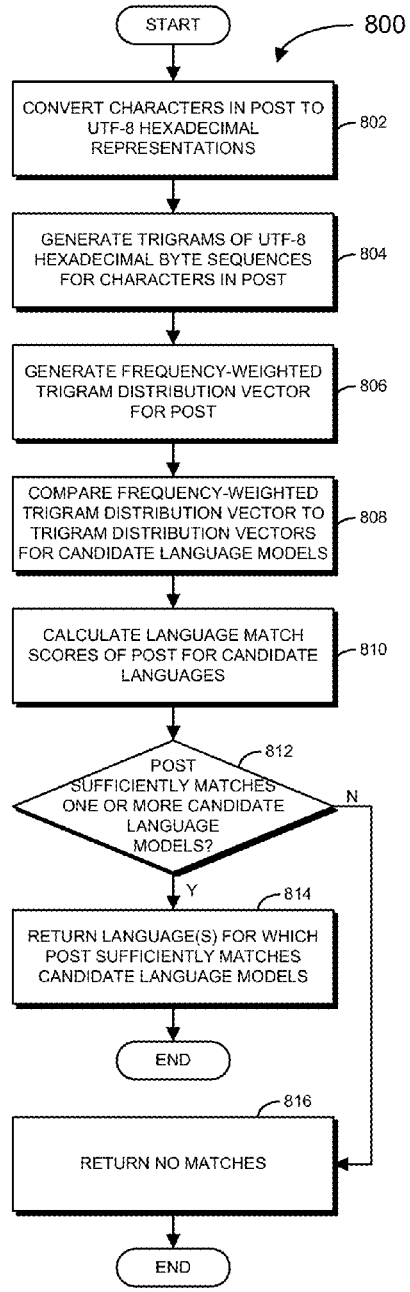

FIG. 8 is a flow chart 800 that illustrates an example of a process for identifying one or more candidate languages for a message (e.g., a post made by a user identity within an electronic social networking platform). The processes illustrated in the flow chart 800 of FIG. 8 may be performed by a computing system, such as, for example, computing system 408 of FIG. 4.

The computing system converts the characters of the message into their UTF-8 hexadecimal representations (802). Taking the input message "new car" as an example, the computing system would convert the input message to: "6E 65 57 20 63 61 72."

The computing system then uses the UTF-8 hexadecimal representations of the characters in the post to generate trigrams of the UTF-8 hexadecimal byte sequences for the characters in the post (804). Taking the input message "new car" again as an example, the computing system would generate the following trigrams of UTF-8 hexadecimal byte sequences: "6E 65 57," "65 57 20," "57 20 63," "20 63 61," and "63 61 72."

The computing system then generates a frequency-weighted trigram distribution vector for the message (806). For example, the computing system may generate a trigram distribution vector for the message in which each trigram in the message is represented by a corresponding element in the vector and in which the elements of the vector are weighted according to the number of times the trigrams to which they correspond appear in the message.

The computing system then compares the frequency-weighted trigram distribution vector for the message to trigram distribution vectors (or, alternatively, trigram distribution tries) for multiple different candidate language models (808). These trigram distribution vectors (or trigram distribution tries) for the different candidate language models may be derived from a common document that is translated into each of the different candidate languages. For example, a document such as the "Universal Declaration of Human Rights" may be translated into each of the different candidate languages. Each of the resulting versions of the document then may be converted into UTF-8 hexadecimal byte sequence trigrams, from which a trigram distribution vector (or a trigram distribution trie) for the candidate language may be generated.

Based on comparing the frequency-weighted trigram distribution vector for the message to the trigram distribution vectors (or the trigram distribution tries) for the different candidate language models, the computing system calculates language match scores for the message for each of the candidate languages (810). For example, the language match score R for the message for an individual one of the candidate language models may be calculated according to the following equation:

$$R = \frac{\sum_{j=1}^{n} f(u_j) \cdot T_j}{n}, \text{ where } T_j = \begin{cases} 1 & \text{if } u_j \in T \\ 0 & \text{Otherwise} \end{cases}$$

where u represents the trigram distribution vector for the message, $f(u_j)$ represents the number of times the jth trigram appears in the trigram distribution vector for the message, T represents the trigram distribution vector (or trigram distribution trie) for the candidate language model, and n represents the numbers of trigrams in the message.

After calculating the language match scores for the message for each of the candidate languages, the computing system then determines if the message sufficiently matches one or more of the candidate language models (812). For example, the computing system may determine that the message sufficiently matches one of the candidate language models if the language match score for the message for the candidate language exceeds some predefined threshold value.

If the computing system determines that the message sufficiently matches one or more of the candidate language models, the process returns indications of the language(s) for which the message was determined to sufficiently match the candidate language model(s) (814). The process then may end. In some implementations, if the message is determined to sufficiently match multiple candidate language models, the computing system may limit the languages returned to some predefined number of languages that the message is determined to match most closely.

Alternatively, if the message does not sufficiently match any of the candidate language models, the process returns a value indicating that no matches were identified (812). The process then may end.

Figure 9:
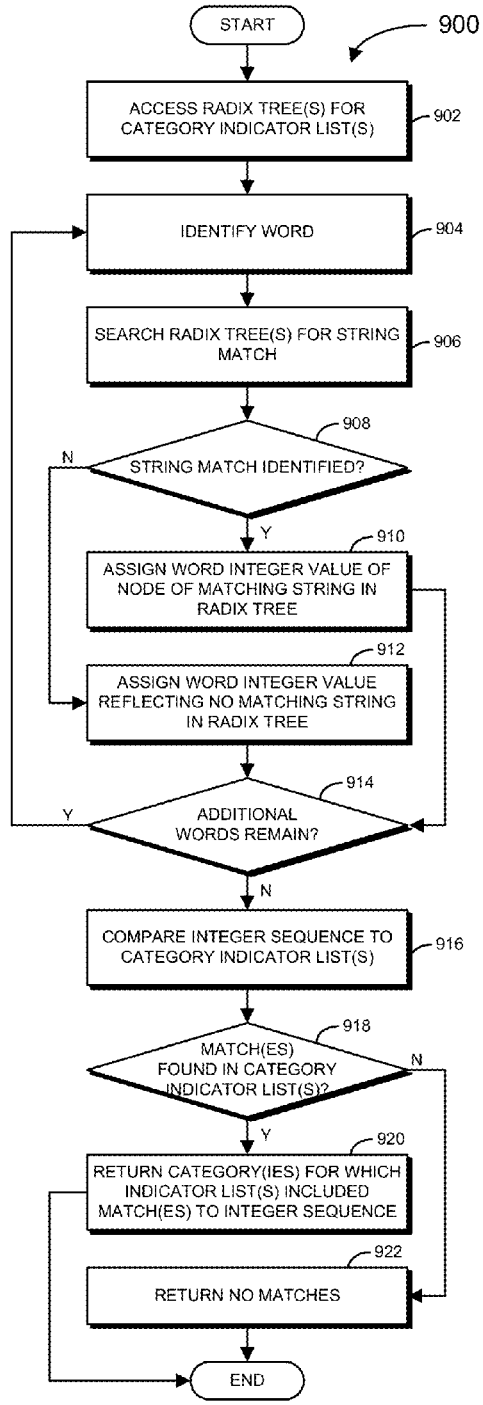

FIG. 9 is a flow chart 900 that illustrates an example of a process for searching text (e.g., a post made by a user identity within an electronic social networking platform or a sentence or phrase in a post made by a user identity within an electronic social networking platform) for category indicators that match category indicator lists. The processes illustrated in the flow chart 900 of FIG. 9 may be performed by a computing system, such as, for example, computing system 408 of FIG. 9.

The computing system accesses one or more radix tree representations of the category indicator lists (902). In some implementations, if there are multiple category indicator lists, all of the category indicator lists may be represented in a single radix tree. In other implementations, each category indicator list may be represented by its own radix tree.

The computing system then identifies an individual word within the text (904) and searches the radix tree representation(s) of the category indicator lists for strings that match the identified word and/or strings that match substrings within the identified word (906). If the computing system finds a match, the computing system assigns the identified word an integer value that represents the match and that is specified in the node that represents the matched string within the radix tree representation(s) of the category indicator lists (910). Alternatively, if the computing system does not find a match, the computing system assigns the identified word an integer value that reflects the absence of a match (e.g., "−1") (912).

The computing system then determines if additional words remain in the text (914), and, if so, repeats this radix tree-based string matching for each word identified within the text. As a result, the computing system converts the text into a sequence of integers. The computing system then compares the integer sequence for the text to integer representations of the category indicators specified in the category indicator lists (916) and attempts to identify matches between the integer sequence representation of the text and the integer representations of the category indicators specified in the category indicator lists (918).

If the computing system determines that there are one or more matches between the integer sequence representation of the text and the integer representations of the category indicators, the computing system returns the category or categories of the category indicator lists for which matches were found in the integer sequence representation of the text (920). The process then may end. Alternatively, if the computing system determines that there are no matches between the integer sequence representation of the text and the integer representations of the category indicators, the computing system returns an indication that no matches were found (922). The process then may end.

A number of methods, techniques, systems, and apparatuses have been described. Nevertheless, various modifications may be made without departing from the scope of this disclosure. For example, although various techniques generally are disclosed herein as being performed externally to an electronic social networking platform, in some implementations, the techniques disclosed herein may be performed internally by an electronic social networking platform.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A computer-implemented method comprising:
   extracting, from an electronic social networking platform, targeted messages that were directed to a particular user identity of the electronic social networking platform within the electronic social networking platform;
   determining, based on the extracted targeted messages that were directed to the particular user identity within the electronic social networking platform, a first number of targeted messages that were directed to the particular user identity within the electronic social networking platform;
   determining a third number of targeted messages that were directed to the particular user identity within the electronic social networking platform by gaming applications that leverage the electronic social networking platform;
   determining, based on the extracted targeted messages that were directed to the particular user identity within the electronic social networking platform, a second number of unique other user identities who are members of the particular user identity's social network within the electronic social networking platform who personally sent targeted messages that were directed to the particular user identity within the electronic social networking platform;
   calculating a numeric measure of the particular user identity's popularity within the electronic social networking platform as a function of the first number of targeted messages that were directed to the particular user identity within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform; and
   storing the calculated numeric measure of the particular user identity's popularity in computer-readable storage media.

2. The method of claim 1 wherein:
   extracting targeted messages that were directed to the particular user identity of the electronic social networking platform within the electronic social networking platform includes extracting targeted messages that were directed to the particular user identity of the electronic social networking platform within the electronic social networking platform during a defined window of time;
   determining a first number of targeted messages that were directed to the particular user identity within the electronic social networking platform includes determining a first number of targeted messages that were directed to the particular user identity within the electronic social networking platform during the defined window of time;
   determining a second number of unique other user identities who are members of the particular user identity's social network within the electronic social networking platform who personally sent targeted messages that were directed to the particular user identity within the electronic social networking platform includes determining a second number of unique other user identities who are members of the particular user identity's social network within the electronic social networking platform who personally sent targeted messages that were directed to the particular user identity within the electronic social networking platform during the defined window of time; and calculating a numeric measure of the particular user identity's popularity within the electronic social networking platform as a function of the first number of targeted messages that were directed to the particular user identity within the electronic social networking, platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform during the defined window of time as a function of the first number of targeted messages that were directed to the particular user identity within the electronic social networking platform during the defined window of time, the second number of unique other user identities who are members of the particular user identity's social network within the electronic social networking platform who personally sent targeted messages that were directed to the particular user identity within the electronic social networking platform during the defined window of time, and the third number of targeted messages that were directed to the particular user identity within the electronic social networking platform by gaming applications that leverage the electronic social networking platform during the defined window of time.

3. The method of claim 2 wherein determining a second number of unique other user identities who are members of the particular user identity's social network within the electronic social networking platform who personally sent targeted messages that were directed to the particular user identity within the electronic social networking platform during the defined window of time includes determining a second number of unique other user identities who are members of the particular user identity's social network within the electronic social networking platform who personally sent targeted messages that were directed to the particular user identity within the electronic social networking platform during the defined window of time that is less than the determined first number of targeted messages that were directed to the particular user identity within the electronic social networking platform during the defined window of time.

4. The method of claim 1 wherein:
determining a first number of targeted messages that were directed to the particular user identity within the electronic social networking platform includes determining a first number of targeted messages that were directed to the particular user identity within the electronic social networking platform personally by other user identities who are members of the particular user identity's social network within the electronic social networking platform; and calculating a numeric measure of the particular user identity's popularity within the electronic social networking platform as a function of the first number of targeted messages that were directed to the particular user identity within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform.

5. The method of claim 4 wherein:
determining a first number of targeted messages that were directed to the particular user identity within the electronic social networking platform personally by other user identities who are members of the particular user identity's social network within the electronic social networking platform includes:
determining a first number of targeted messages that were directed to the particular user identity within the electronic social networking platform personally by other user identities who are members of the particular user identity's social network within the electronic social networking platform that are related to the particular user identity's birthday, and
determining a fourth number of targeted messages that were directed to the particular user identity within the electronic social networking platform personally by other user identities who are members of the particular user identity's social network within the electronic social networking platform that are not related to the particular user identity's birthday; and calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform that are related to the particular user identity's birthday, the fourth number of targeted messages that were directed to the particular user identity within the electronic social networking platform personally by other user identities who are members of the particular user identity's social network within the electronic social networking platform that are not related to the particular user identity's birthday, and birthday, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform.

6. The method of claim 4 further comprising:
extracting, from the electronic social networking platform, data that reveals events to which the particular user identity has received invitations within the electronic social networking platform;
based on the extracted data revealing events to which the particular user identity has received invitations within the electronic social networking platform, determining a fourth number of the events to which the particular user identity has received invitations for which at least some predefined percentage of invitees have accepted their invitations; and
calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the fourth number of the events to which the particular user identity has received invitations for which at least some predefined percentage of invitees have accepted their invitations, and the third number of targeted messages that were directed to the particular user identity within the electronic social networking platform by gaming applications that leverage the electronic social networking platform.

7. A computer-implemented method comprising:
extracting, from an electronic social networking platform, status posts generally broadcast by a particular user identity of the electronic social networking platform to other user identities who are members of the particular user identity's social network within the electronic social networking platform;
extracting, from the electronic social networking platform, data revealing responsive comments to the extracted status posts received from other user identities who are members of the particular user identity's social network;
extracting, from the electronic social networking platform, data revealing endorsements of the extracted status posts received from other user identities who are members of the particular user identity's social network;
determining, based on the extracted data that reveals responsive comments to the extracted status posts received from other user identities who are members of the particular user identity's social network and the extracted data that reveals endorsements of the extracted status posts received from other user identities who are members of the particular user identity's social network, an average number of responsive comments and endorsements received per extracted status post;
determining, based on the extracted data that reveals responsive comments to the extracted status posts received from user identities who are members of the particular user identity's social network, a first number of responsive comments to the extracted status posts received from user identities who are members of the particular user identity's social network;
determining, based on the extracted data that reveals endorsements of the extracted status posts received from other user identities who are members of the particular user identity's social network, a second number of endorsements of the extracted status posts received from other user identities who are members of the particular user identity's social network;
determining, based on the extracted data that reveals responsive comments to the extracted status posts received from user identities who are members of the particular user identity's social network, a third number of unique user identities who are members of the particular user identity's social network from whom responsive comments to the extracted status posts were received;
determining, based on the extracted data that reveals endorsements of the extracted status posts received from other user identities who are members of the particular user identity's social network, a fourth number of unique user identities who are members of the particular user identity's social network from whom endorsements of the extracted status posts were received calculating a numeric measure of the particular user identity's influence within the electronic social networking platform according to the following formula:

$$\text{influence} = (0.25(c\_r + 2 \times c\_\text{UIDs} + 0.5 \times e\_r + 2 \times e\_\text{UIDs}))(\text{avg\_resp})$$

where, c_r represents the first number of responsive comments to the extracted status posts received from user identities who are members of the particular user identity's social network, c_UIDs represents the third number of unique user identities who are members of the particular user identity's social network from whom response comments to the extracted status posts were received, e_r represents the second number of endorsements of the extracted status posts received from other user identities who are members of the particular user identity's social network, e_UIDs represents the fourth number of unique user identities who are members of the particular user identity's social network from whom endorsements of the extracted status posts were received, and avg_resp represents the average number of responsive comments and endorsements received per extracted status post; and storing the calculated numeric measure of the particular user identity's influence in computer-readable storage media.

8. The method of claim 7 wherein:

extracting status posts generally broadcast by a particular user identity of the electronic social networking platform to other user identities who are members of the particular user identity's social network within the electronic social networking platform includes extracting status posts generally broadcast by a particular user identity of the electronic social networking platform during a defined window of time to other user identities who are members of the particular user identity's social network within the electronic social networking platform; and calculating a numeric measure of the particular user identity's influence within the electronic social networking platform as a function of the average number of responsive comments and endorsements received per extracted status post includes calculating a numeric measure of the particular user identity's influence within the electronic social networking platform during the defined window of time.

9. A system comprising:

one or more computers and one or more storage devices storing instructions that are operable, when executed by the one or more computers, to cause the one or more computers to perform operations comprising:

extracting, from an electronic social networking platform, targeted messages that were directed to a particular user identity of the electronic social networking platform within the electronic social networking platform;

determining, based on the extracted targeted messages that were directed to the particular user identity within the electronic social networking platform, a first number of targeted messages that were directed to the particular user identity within the electronic social networking platform;

determining a third number of targeted messages that were directed to the particular user identity within the electronic social networking platform by gaming applications that leverage the electronic social networking platform;

determining, based on the extracted targeted messages that were directed to the particular user identity within the electronic social networking platform, a second number of unique other user identities who are members of the particular user identity's social network within the electronic social networking platform who personally sent targeted messages that were directed to the particular user identity within the electronic social networking platform;

calculating a numeric measure of the particular user identity's popularity within the electronic social networking platform as a function of the first number of targeted messages that were directed to the particular user identity within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform; and storing the calculated numeric measure of the particular user identity's popularity in computer-readable storage media.

10. The system of claim 9 wherein:

extracting targeted messages that were directed to the particular user identity of the electronic social networking platform within the electronic social networking platform includes extracting targeted messages that were directed to the particular user identity of the electronic social networking platform within the electronic social networking platform during a defined window of time;

determining a first number of targeted messages that were directed to the particular user identity within the electronic social networking platform includes determining a first number of targeted messages that were directed to the particular user identity within the electronic social networking platform during the defined window of time;

determining a second number of unique other user identities who are members of the particular user identity's social network within the electronic social networking platform who personally sent targeted messages that were directed to the particular user identity within the electronic social networking platform includes determining a second number of unique other user identities who are members of the particular user identity's social network within the electronic social networking platform who personally sent targeted messages that were directed to the particular user identity within the electronic social networking platform during the defined window of time; and calculating a numeric measure of the particular user identity's popularity within the electronic social networking platform as a function of the first number of targeted messages that were directed to the particular user identity within the electronic social networking, platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform during the defined window of time as a function of the first number of targeted messages that were directed to the particular user identity within the electronic social networking platform during the defined window of time, the second number of unique other user identities who are members of the particular user identity's social network within the electronic social networking platform who personally sent targeted messages that were directed to the particular user identity within the electronic social networking platform during the defined window of time, and the third number of targeted messages that were directed to the particular user identity within the electronic social networking platform by gaming applications that leverage the electronic social networking platform during the defined window of time.

11. The system of claim 10 wherein determining a second number of unique other user identities who are members of the particular user identity's social network within the electronic social networking platform who personally sent targeted messages that were directed to the particular user identity within the electronic social networking platform during the defined window of time includes determining a second number of unique other user identities who are members of the particular user identity's social network within the electronic social networking platform who personally sent targeted messages that were directed to the particular user identity within the electronic social networking platform during the defined window of time that is less than the determined first number of targeted messages that were directed to the particular user identity within the electronic social networking platform during the defined window of time.

12. The system of claim 9 wherein:
determining a first number of targeted messages that were directed to the particular user identity within the electronic social networking platform includes determining a first number of targeted messages that were directed to the particular user identity within the electronic social networking platform personally by other user identities who are members of the particular user identity's social network within the electronic social networking platform; and
calculating a numeric measure of the particular user identity's popularity within the electronic social networking platform as a function of the first number of targeted messages that were directed to the particular user identity within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform.

13. The system of claim 12 wherein:
determining a first number of targeted messages that were directed to the particular user identity within the electronic social networking platform personally by other user identities who are members of the particular user identity's social network within the electronic social networking platform includes:
determining a first number of targeted messages that were directed to the particular user identity within the electronic social networking platform personally by other user identities who are members of the particular user identity's social network within the electronic social networking platform that are related to the particular user identity's birthday, and
determining a fourth number of targeted messages that were directed to the particular user identity within the electronic social networking platform personally by other user identities who are members of the particular user identity's social network within the electronic social networking platform that are not related to the particular user identity's birthday; and
calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform that are related to the particular user identity's birthday, the fourth number of targeted messages that were directed to the particular user identity within the electronic social networking platform personally by other user identities who are members of the particular user identity's social network within the electronic social networking platform that are not related to the particular user identity's birthday, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform.

14. The system of claim 12 further comprising:
   extracting, from the electronic social networking platform, data that reveals events to which the particular user identity has received invitations within the electronic social networking platform;
   based on the extracted data revealing events to which the particular user identity has received invitations within the electronic social networking platform, determining a fourth number of the events to which the particular user identity has received invitations for which at least some predefined percentage of invitees have accepted their invitations; and
   calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the third number of targeted messages that were directed to the particular user identity within the electronic social networking platform by gaming applications that leverage the electronic social networking platform includes calculating a numeric measure of the particular user identity's popularity within the electronic social networking platform as a function of the first number of targeted messages that were directed to the particular user identity within the electronic social networking platform personally by other user identities who are members of the particular user identity's social network within the electronic social networking platform, the second number of unique other user identities who are members of the particular user identity's social network within the electronic social networking platform who personally sent targeted messages that were directed to the particular user identity within the electronic social networking platform, and the fourth number of the events to which the particular user identity has received invitations for which at least some predefined percentage of invitees have accepted their invitations, and the third number of targeted messages that were directed to the particular user identity within the electronic social networking platform by gaming applications that leverage the electronic social networking platform.

* * * * *